US011449890B2

(12) United States Patent
Umemura

(10) Patent No.: US 11,449,890 B2
(45) Date of Patent: Sep. 20, 2022

(54) INFORMATION SYSTEM, CARD DEVICE, TERMINAL DEVICE, AND SERVER DEVICE

(71) Applicant: HELPLE HOLDINGS INC., Newark City, DE (US)

(72) Inventor: Keiji Umemura, Newark City, DE (US)

(73) Assignee: HELPLE HOLDINGS INC., Newark, DE (US)

( * ) Notice: Subject to any disclaimer, the term of this patent is extended or adjusted under 35 U.S.C. 154(b) by 17 days.

(21) Appl. No.: 16/306,846

(22) PCT Filed: Jun. 2, 2017

(86) PCT No.: PCT/JP2017/020649
§ 371 (c)(1),
(2) Date: Dec. 3, 2018

(87) PCT Pub. No.: WO2017/209286
PCT Pub. Date: Dec. 7, 2017

(65) Prior Publication Data
US 2019/0147478 A1    May 16, 2019

(30) Foreign Application Priority Data

Jun. 3, 2016   (JP) .............................. JP2016-112194
Dec. 6, 2016   (JP) ................................ 2016-236643

(51) Int. Cl.
*G06Q 30/02*    (2012.01)
*G06Q 20/34*    (2012.01)

(52) U.S. Cl.
CPC ....... *G06Q 30/0229* (2013.01); *G06Q 20/341* (2013.01); *G06Q 20/3572* (2013.01); *G06Q 30/02* (2013.01)

(58) Field of Classification Search
CPC .. G06Q 20/341; G06Q 30/0229; G06Q 30/02; G06Q 20/3572; G06Q 20/387; G06Q 20/356; G06Q 20/3555; G06Q 30/0207
See application file for complete search history.

(56) References Cited

U.S. PATENT DOCUMENTS

2008/0029607 A1   2/2008   Mullen
2008/0054068 A1   3/2008   Mullen
(Continued)

FOREIGN PATENT DOCUMENTS

CN   104077712 A   10/2014
JP   2011-3037 A   1/2011
(Continued)

OTHER PUBLICATIONS

Wiley Encyclopedia of Computer Science and Engineering (Year: 2009).*
(Continued)

*Primary Examiner* — Breffni Baggot
(74) *Attorney, Agent, or Firm* — McDermott Will & Emery LLP

(57) ABSTRACT

[Problem] To assist a user to use a card with which the user can receive a beneficial reward. [Solution] An information system including: a store information storage unit in which one or more pieces of store information are stored, each piece of store information including a store identifier that identifies a store, and two or more pieces of card information each including a card identifier that identifies a card that is available at the store and reward information regarding a reward that is to be gained when the card is used; a store specifying information accepting unit that accepts store specifying information that specifies a store at which a card is used; an owned-card specifying information acquisition unit that acquires owned-card specifying information that specifies two or more cards owned by a user; a reward-
(Continued)

related information acquisition unit that uses two or more pieces of reward information included in card information regarding two or more cards corresponding to two or more pieces of card information included in store information regarding a store specified by the store specifying information, out of two or more cards specified by the owned-card specifying information, to acquire reward-related information related to reward information regarding two or more cards that the user can use at the store; and a reward-related information output unit that outputs the reward-related information.

5 Claims, 21 Drawing Sheets

(56) References Cited

U.S. PATENT DOCUMENTS

| | | | |
|---|---|---|---|
| 2008/0054079 A1 | 3/2008 | Mullen | |
| 2008/0054081 A1 | 3/2008 | Mullen | |
| 2008/0065555 A1 | 3/2008 | Mullen | |
| 2008/0302869 A1 | 12/2008 | Mullen | |
| 2008/0302876 A1 | 12/2008 | Mullen | |
| 2009/0018923 A1* | 1/2009 | Chen | G06Q 20/04 |
| | | | 705/17 |
| 2009/0308921 A1 | 12/2009 | Mullen | |
| 2011/0272471 A1 | 11/2011 | Mullen | |
| 2011/0272478 A1 | 11/2011 | Mullen | |
| 2013/0024371 A1 | 1/2013 | Hariramani et al. | |
| 2013/0200999 A1 | 8/2013 | Spodak et al. | |
| 2014/0114756 A1* | 4/2014 | Takahashi | G06Q 30/02 |
| | | | 705/14.53 |
| 2014/0117456 A1* | 5/2014 | Huang | H01L 21/823412 |
| | | | 257/368 |
| 2014/0122213 A1* | 5/2014 | Wong | G06Q 30/0233 |
| | | | 705/14.33 |
| 2014/0129357 A1* | 5/2014 | Goodwin | G06Q 20/227 |
| | | | 705/16 |
| 2014/0297383 A1 | 10/2014 | Mashiko | |
| 2015/0012425 A1* | 1/2015 | Mathew | G06Q 20/10 |
| | | | 705/41 |
| 2016/0117660 A1* | 4/2016 | Prakash | H04W 4/70 |
| | | | 705/14.64 |
| 2017/0193485 A1* | 7/2017 | Wu | G06Q 30/0226 |
| 2018/0174131 A1* | 6/2018 | Brudnicki | G06Q 20/385 |

FOREIGN PATENT DOCUMENTS

| | | |
|---|---|---|
| JP | 201283913 A | 4/2012 |
| JP | 2014-199577 A | 10/2014 |
| JP | 2015-121997 A | 7/2015 |
| JP | 2015-176346 A | 10/2015 |
| JP | 2016-35695 A | 3/2016 |
| JP | 2016-71658 A | 5/2016 |

OTHER PUBLICATIONS

Notice of Reasons for Refusal issued in Japanese Patent Application No. 2016-236643, dated Jul. 5, 2019, with English translation.
"Plastcs", plastcs Inc., [online], [Search on May 18, 2016], Internet [URL: https://plastc.com/].
"Stratos", Stratos, Inc., [online], [Search on May 18, 2016], Internet [URL: https://stratoscard.com/].
"Coin", Coin, Inc., [online], [Search on May 18, 2016], Internet [URL: https://onlycoin.com/].
Extended European Search Report issued in corresponding European Application No. 17806836.7, dated Nov. 14, 2019.
International Search Report dated Aug. 7, 2017, issued in International Application No. PCT/JP2017/020649, with English Translation.
Notice of Reasons fo Refusal dated Dec. 15, 2020 in Japanese Application No. 2019-182988, with English translation.
First Office Action issued in Chinese Patent Application No. 201780033092.5, dated Apr. 30, 2021 w/English Machine Translation.
First Examination Report Issued in Indian Patent Application No. 201847049974, dated Jul. 13, 2021.
Notification of Reasons for Refusal issued in Korean Application No. 10-2018-7035907, dated Sep. 28, 2021 w/ Machine English Translation.
Communication pursuant to Article 94(3) EPC issued in European Application No. 17806836.7, dated Oct. 13, 2021.

* cited by examiner

| ID | Store identifier | Card information 1 | | Card information 2 | | .... |
|---|---|---|---|---|---|---|
| | | Card identifier | Reward information | Card identifier | Reward information | .... |
| 1 | AAA | aaa | 1 point per 100 yen | bbb | 2 points per 100 yen | .... |
| 2 | BBB | ccc | 5% Off | ddd | 100 yen discount | .... |
| ⋮ | ⋮ | ⋮ | ⋮ | ⋮ | ⋮ | ⋮ |

FIG.5

INFORMATION SYSTEM, CARD DEVICE, TERMINAL DEVICE, AND SERVER DEVICE

This application is a U.S. National Phase under 35 U.S.C. § 371 of International Application No. PCT/JP2017/020649, filed on Jun. 2 2017, which in turn claims the benefit of Japanese Application No. 2016-112194, filed Jun. 3, 2016 and Japanese Application No. 2016-236643, filed Dec. 6, 2016, the disclosures of which are incorporated in their entireties by reference herein.

TECHNICAL FIELD

The present invention relates to an information system and so on that assist a user in using a card. The present invention also relates to an information system and so on that process credit card information.

BACKGROUND ART

In recent years, there are many services in which a user using a card at a store can receive a reward such as points or a discount. Generally, different cards are available at different stores, and a reward is also different depending on which card is used. Therefore, many users have two or more cards. However, it is a burden for a user to carry all of his/her cards with him/her.

To solve this problem, there are conventional information systems that reduce such a burden by managing information regarding two or more cards owned by one user, on one card (for example, see Non-patent Documents 1, 2, and 3).

Conventional information systems also include a prepaid settlement system in which a credit card number assigned by a credit card issuing company is stored, each customer is given a credit card number, and when a customer makes a payment, the customer uses the given credit card number to perform settlement (for example, see Patent Document 1). This system also allows a customer's credit card number to be changed in response to a request from the customer.

CITATION LIST

Non-Patent Document

Non-patent Document 1: "plastcs", plastcs Inc., [online], [accessed on May 18, 2016], the Internet [URL: https://plastc.com/]
Non-patent Document 2: "STRATOS", Stratos, Inc., [online], [accessed on May 18, 2016], the Internet [URL: https://stratoscard.com/]
Non-patent Document 3: "COIN", Coin, Inc., [online], [accessed on May 18, 2016], the Internet, [URL: https://onlycoin.com/]

Patent Document

Patent Document 1: JP 2011-3037A (page 1, FIG. 1, etc.)

SUMMARY OF THE INVENTION

Technical Problem

However, the above-described conventional information systems also do not manage information regarding a reward of each card that a user can receive when using the card. Which card is to be used is up to the user's selection, and it is not easy for the user to determine and use a card with which the user can receive a reward that is beneficial for the user.

Therefore, the present invention aims to realize an information system and so on that assist a user to use a card with which the user can receive a reward (points, a discount, or the like) that is beneficial for the user.

Conventional information systems also can not automatically change a credit card number.

Therefore, the present invention aims to realize an information system and so on that can automatically change a credit card number.

Solution to Problem

An information system according to one aspect of the present invention is an information system including: a store information storage unit in which one or more pieces of store information are stored, each piece of store information including a store identifier that identifies a store, and two or more pieces of card information each including a card identifier that identifies a card that is available at the store and reward information regarding a reward that is to be gained when the card is used; a store specifying information accepting unit that accepts store specifying information that specifies a store at which a card is used when an item or a service is purchased; a reward-related information acquisition unit that uses two or more pieces of reward information included in card information regarding two or more cards corresponding to two or more pieces of card information included in store information regarding a store specified by the store specifying information, out of two or more cards specified by owned-card specifying information that is stored information that specifies two or more cards owned by a user who purchases an item or a service, to acquire reward-related information related to reward information regarding two or more cards that the user can use at the store; and a reward-related information output unit that outputs the reward-related information acquired by the reward-related information acquisition unit.

Such a configuration realizes an information system that assists a user to use a card with which the user can receive a reward that is beneficial for the user. As a result, the user can easily select a card with which the user can receive a beneficial reward, from among multiple cards that are available at the store and owned by the user, by using reward-related information that has been output.

An information system according to a second aspect of the present invention is the information system according to the first aspect of the invention, wherein the reward-related information acquisition unit uses reward information regarding two or more cards that the user can use at the store, to acquire reward-related information that specifies a card corresponding to reward information that indicates the highest reward, based on a predetermined method.

Such a configuration enables the user to easily select a card with which the user can receive the most beneficial reward. That is, the user can select a card such that the user can receive the highest reward at each store.

An information system according to a third aspect of the present invention is the information system according to the first aspect of the invention, wherein the reward-related information acquisition unit uses reward information regarding two or more cards that the user can use at the store, to acquire ranks of the two or more pieces of reward information, based on a predetermined method, and acquire reward-related information that specifies the ranks.

Such a configuration enables the user to select a card that is to be used, using reward-related information that specifies the ranks of the two or more pieces of reward information and considering the ranks of the rewards as well.

An information system according to a fourth aspect of the present invention is the information system according to any one of the first to third aspects of the invention, the information system including: a server device; a terminal device; and a card device, the server device including: the store information storage unit; the store specifying information accepting unit that receives the store specifying information from the terminal device; an owned-card specifying information acquisition unit that receives the owned-card specifying information from the terminal device; the reward-related information acquisition unit that uses two or more pieces of reward information included in card information regarding two or more cards corresponding to two or more pieces of card information included in store information regarding a store specified by the store specifying information received by the owned-card specifying information acquisition unit, out of two or more cards specified by the owned-card specifying information received by the store specifying information accepting unit, to acquire reward-related information related to reward information regarding two or more cards that the user can use at the store; and the reward-related information output unit that outputs the reward-related information acquired by the reward-related information acquisition unit to the terminal device, the terminal device including: an owned-card specifying information storage unit in which the owned-card specifying information is stored; a second store specifying information accepting unit that accepts the store specifying information; a store specifying information transmitting unit that transmits the store specifying information accepted by the second store specifying information accepting unit to the server device; a second owned-card specifying information acquisition unit that acquires owned-card specifying information from the owned-card specifying information storage unit; an owned-card specifying information transmitting unit that transmits the owned-card specifying information acquired by the second owned-card specifying information acquisition unit to the server device; a reward-related information receiving unit that receives the reward-related information from the server device; and a reward-related information transmitting unit that transmits the reward-related information received by the reward-related information receiving unit to the card device, and the card device including: a second reward-related information receiving unit that receives the reward-related information from the terminal device; and a second reward-related information output unit that outputs the reward-related information received by the second reward-related information receiving unit.

Such a configuration realizes an information system that includes the server device, the terminal device, and the card device, and in which the server device plays the leading role and assists the user to use a card with which the user can receive a beneficial reward.

An information system according to a fifth aspect of the present invention is the information system according to any one of the first to third aspects of the invention, the information system including: a server device; a terminal device; and a card device, the server device including: the store information storage unit; the store specifying information accepting unit that receives the store specifying information from the terminal device; a card information acquisition unit that acquires, from the store information storage unit, two or more pieces of card information corresponding to the store specifying information received by the store specifying information accepting unit; and a card information transmitting unit that transmits the two or more pieces of card information acquired by the card information acquisition unit to the terminal device, the terminal device including: an owned-card specifying information storage unit in which owned-card specifying information that specifies two or more cards owned by a user is stored; a second store specifying information accepting unit that accepts the store specifying information; a store specifying information transmitting unit that transmits the store specifying information accepted by the second store specifying information accepting unit to the server device; a card information receiving unit that receives the two or more pieces of card information from the server device in response to the store specifying information being transmitted; an owned-card specifying information acquisition unit that acquires the owned-card specifying information from the owned-card specifying information storage unit; the reward-related information acquisition unit that uses two or more pieces of reward information included in the two or more pieces of card information received by the card information receiving unit, and the owned-card specifying information, to acquire reward-related information related to reward information regarding two or more cards that the user can use at the store; and the reward-related information output unit that transmits the reward-related information acquired by the reward-related information acquisition unit to the card device, and the card device including: a reward-related information receiving unit that receives the reward-related information from the terminal device; and a second reward-related information output unit that outputs the reward-related information received by the reward-related information receiving unit.

Such a configuration realizes an information system that includes the server device, the terminal device, and the card device, and in which the terminal device plays the leading role and assists the user to use a card with which the user can receive a beneficial reward.

An information system according to a sixth aspect of the present invention is the information system according to any one of the first to third aspects of the invention, wherein each of the two or more cards is a card that has a credit card function, the information system further includes: a credit card information storage unit in which credit card information that includes at least a credit card number of a card is stored; a card selection accepting unit that accepts selection of one card from among two or more cards, in response to reward-related information being output by the reward-related information output unit; and a credit card information output unit that outputs at least a credit card number included in credit card information that is stored in the credit card information storage unit and that constitutes a pair with the one card, in response to the selection being accepted; and a credit card number changing unit that, when a predetermined condition is satisfied, changes a credit card number included in each of one or more pieces of credit card information stored in the credit card information storage unit.

Such a configuration makes it possible to automatically change a credit card number.

An information system according to a seventh aspect of the present invention is the information system according to any one of the first to third aspects of the invention, the information system including: a server device; and a card device, the server device including: the store information storage unit; the store specifying information accepting unit that receives the store specifying information from the card device; a card information acquisition unit that acquires, from the store information storage unit, two or more pieces of card information corresponding to the store specifying information received by the store specifying information accepting unit; a card information transmitting unit that transmits the two or more pieces of card information acquired by the card information acquisition unit to the card device; an owned-card specifying information acquisition unit that receives, from the card device, owned-card specifying information that specifies two or more cards owned by a user who purchases an item or a service; the reward-related information acquisition unit that uses two or more pieces of reward information included in card information regarding two or more cards corresponding to two or more pieces of card information included in store information regarding a store specified by the store specifying information received by the store specifying information accepting unit, out of two or more cards specified by the owned-card specifying information received by the owned-card specifying information acquisition unit, to acquire reward-related information related to reward information regarding two or more cards that the user can use at the store; and the reward-related information output unit that transmits the reward-related information acquired by the reward-related information acquisition unit to the card device, and the card device including: an owned-card specifying information storage unit in which owned-card specifying information that specifies two or more cards owned by a user is stored; a second store specifying information accepting unit that accepts the store specifying information; a store specifying information transmitting unit that transmits the store specifying information to the server device; a card information receiving unit that receives the two or more pieces of card information from the server device in response to the store specifying information being transmitted; a second owned-card specifying information acquisition unit that acquires owned-card specifying information from the owned-card specifying information storage unit; an owned-card specifying information transmitting unit that transmits the owned-card specifying information acquired by the second owned-card specifying information acquisition unit to the server device; a reward-related information receiving unit that receives the reward-related information; and a second reward-related information output unit that outputs the reward-related information received by the reward-related information receiving unit.

Such a configuration realizes an information system that includes the server device and the card device, and in which the server device plays the leading role and assists the user to use a card with which the user can receive a beneficial reward.

A card device according to an eighth aspect of the present invention is a card device including: an owned-card specifying information storage unit in which owned-card specifying information that specifies two or more cards owned by a user is stored; a reward-related information receiving unit that receives reward-related information; and a reward-related information output unit that outputs one or more pieces of reward-related information received by the reward-related information receiving unit.

Such a configuration realizes a card device that cooperates with a server device and that assists a user to use a card with which the user can receive a reward that is beneficial for the user.

A card device according to a ninth aspect of the present invention is the card device according to the eighth aspect, wherein settlement is performed using a card corresponding to one piece of reward-related information out of the one or more pieces of reward-related information output by the reward-related information output unit.

Such a configuration enables a user to select one card based on one or more pieces of reward-related information that have been output, and use the card to perform settlement.

A terminal device according to a tenth aspect of the present invention is a terminal device including: an owned-card specifying information storage unit in which owned-card specifying information that specifies two or more cards owned by a user is stored; a store specifying information accepting unit that accepts store specifying information; a store specifying information transmitting unit that transmits the store specifying information to a server device; a card information receiving unit that receives the two or more pieces of card information from the server device in response to the store specifying information being transmitted; a reward-related information acquisition unit that acquires reward-related information related to reward information regarding two or more cards that the user can use at a store, using the owned-card specifying information stored in the owned-card specifying information storage unit and two or more pieces of reward information included in the two or more pieces of card information received by the card information receiving unit; and a reward-related information output unit that outputs the reward-related information acquired by the reward-related information acquisition unit.

Such a configuration realizes a terminal device that cooperates with a server device and that assists a user to use a card with which the user can receive a reward that is beneficial for the user.

A server device according to an eleventh aspect of the present invention is a server device including: a store information storage unit in which one or more pieces of store information are stored, each piece of store information including a store identifier that identifies a store, and two or more pieces of card information each including a card identifier that identifies a card that is available at the store and reward information regarding a reward that is to be gained when the card is used; a store specifying information receiving unit that receives store specifying information that specifies a store at which a card is used when an item or a service is purchased; a reward-related information acquisition unit that uses two or more pieces of reward information included in card information regarding two or more cards corresponding to two or more pieces of card information included in store information regarding a store specified by the store specifying information, out of two or more cards specified by owned-card specifying information that is stored information that specifies two or more cards owned by a user who purchases an item or a service, to acquire reward-related information related to reward information regarding two or more cards that the user can use at the store; and a reward-related information output unit that outputs the reward-related information acquired by the reward-related information acquisition unit.

Such a configuration realizes a server device that assists a user to use a card with which the user can receive a reward that is beneficial for the user.

An information system according to a twelfth aspect of the present invention is an information system including: a credit card information storage unit in which one or more pieces of credit card information are stored, each piece of credit card information including at least a credit card number of a card that has a credit card function, and constituting a pair with user identification information that identifies a user of the card; an output request accepting unit that accepts an output request that requests output of credit card information that constitutes a pair with one piece of user identification information; a credit card information output unit that outputs at least a credit card number included in credit card information that is stored in the credit card information storage unit and that constitutes a pair with one piece of user identification information, in response to the output request being accepted; and a credit card number changing unit that, when a predetermined condition is satisfied, changes a credit card number included in the credit card information stored in the credit card information storage unit.

Such a configuration makes it possible to automatically change a credit card number. As a result, for example, security is improved when settlement is performed using a card.

An information system according to a thirteenth aspect of the present invention is the information system according to the twelfth aspect of the invention, further including: a timing information storage unit in which timing information that indicates predetermined timing is stored, wherein the credit card number changing unit changes the credit card number at each timing indicated by the timing information.

Such a configuration makes it possible to change a credit card number according to timing information.

An information system according to a fourteenth aspect of the present invention is the information system according to the first aspect of the invention, further including: a usage mode information acquisition unit that acquires usage mode information that indicates a usage mode in which a credit card function of a card is used, wherein the credit card number changing unit changes the credit card number at a frequency corresponding to the usage mode indicated by the usage mode information.

Such a configuration makes it possible to change a credit card number at a frequency corresponding to a frequency at which the credit function is used.

An information system according to a fifteenth aspect of the present invention is the information system according to any one of the twelfth to fourteenth aspects of the invention, the information system including a credit card information processing device and a card device, the credit card information processing device including: a credit card information storage unit; a credit card number changing unit; an output request receiving unit that receives an output request in a pair with user identification information; and a credit card information transmitting unit that transmits the credit card information that is stored in the credit card information storage unit and that constitutes a pair with user identification information, in response to the output request being received, the card device including: a user identification information storage unit in which one piece of user identification information is stored; an output request accepting unit; an output request transmitting unit that transmits the output request accepted by the output request accepting unit, in a pair with the one piece of user identification information; a credit card information receiving unit that receives the credit card information transmitted by the credit card information transmitting unit in response to the output request; and a credit card information output unit that outputs at least a credit card number included in the credit card information received by the credit card information receiving unit.

With such a configuration, the credit card information processing device can automatically change the credit card number output by the card device.

An information system according to a sixteenth aspect of the present invention is the information system according to any one of the twelfth to fourteenth aspects of the invention, the information system including: a credit card information processing device; a terminal device; and a card device, the credit card information processing device including: a credit card information storage unit; a credit card number changing unit; an output request receiving unit that receives an output request in a pair with user identification information; and a credit card information transmitting unit that transmits the credit card information that is stored in the credit card information storage unit and that constitutes a pair with user identification information, in response to the output request being received, the terminal device including: an output request transfer unit that receives an output request in a pair with user identification information, and transmits the output request to the credit card information processing device; and a credit card information transfer unit that receives the credit card information transmitted by the credit card information transmitting unit, and transmits the credit card information to the card device, and the card device including: a user identification information storage unit in which one piece of user identification information is stored; an output request accepting unit; an output request transmitting unit that transmits the output request accepted by the output request accepting unit, in a pair with the one piece of user identification information; a credit card information receiving unit that receives the credit card information transmitted by the credit card information transmitting unit in response to the output request; and a credit card information output unit that outputs at least a credit card number included in the credit card information received by the credit card information receiving unit.

With such a configuration, the credit card information processing device can automatically change the credit card number output by the card device, using the terminal device.

An information system according to a seventeenth aspect of the present invention is the information system according to the sixteenth aspect of the invention, the information system further including: a timing information storage unit in which timing information that indicates predetermined timing is stored, wherein the credit card number changing unit changes the credit card number at each timing indicated by the timing information.

Such a configuration makes it possible to change a credit card number according to timing information.

An information system according to an eighteenth aspect of the present invention is the information system according to the sixteenth or seventeenth aspect of the invention, the information system further including: a usage mode information acquisition unit that acquires usage mode information that indicates a usage mode in which a credit card function of a card is used, wherein the credit card number changing unit changes the credit card number at a frequency corresponding to the usage mode indicated by the usage mode information.

Such a configuration makes it possible to change a credit card number at a frequency corresponding to a frequency at which the credit card function is used.

An information system according to a nineteenth aspect of the present invention is the information system according to any one of the sixteenth to eighteenth aspects of the invention, the information system including: a credit card information processing device; and a card device, the credit card information processing device including: a credit card information storage unit; a credit card number changing unit; an output request receiving unit that receives an output request in a pair with user identification information; and a credit card information transmitting unit that transmits the credit card information that is stored in the credit card information storage unit and that constitutes a pair with user identification information, in response to the output request being received, the card device including: a user identification information storage unit in which one piece of user identification information is stored; an output request accepting unit; an output request transmitting unit that transmits the output request accepted by the output request accepting unit, in a pair with the one piece of user identification information; a credit card information receiving unit that receives the credit card information transmitted by the credit card information transmitting unit in response to the output request; and a credit card information output unit, wherein the credit card information output unit outputs at least a credit card number included in the credit card information received by the credit card information receiving unit.

Such a configuration makes it possible to periodically change a credit card number output by the card device.

An information system according to a twentieth aspect of the present invention is the information system according to any one of the sixteenth to eighteenth aspects of the invention, the information system including: a credit card information processing device; a terminal device; and a card device, the credit card information processing device including: a credit card information storage unit; a credit card number changing unit; an output request receiving unit that receives an output request in a pair with user identification information; and a credit card information transmitting unit that transmits the credit card information that is stored in the credit card information storage unit and that constitutes a pair with user identification information, in response to the output request being received, the terminal device including: an output request transfer unit that receives an output request in a pair with user identification information, and transmits the output request to the credit card information processing device; and a credit card information transfer unit that receives the credit card information transmitted by the credit card information transmitting unit, and transmits the credit card information to the card device, and the card device including: a user identification information storage unit in which one piece of user identification information is stored; an output request accepting unit; an output request transmitting unit that transmits the output request accepted by the output request accepting unit, in a pair with the one piece of user identification information; a credit card information receiving unit that receives the credit card information transmitted by the credit card information transmitting unit in response to the output request; and a credit card information output unit, wherein the credit card information output unit outputs at least a credit card number included in the credit card information received by the credit card information receiving unit.

Such a configuration makes it possible to periodically change a credit card number output by the card device, using the terminal device.

Advantageous Effects of Invention

The present invention realizes an information system and so on that assist a user to use a card with which the user can receive a reward that is beneficial for the user.

The present invention also realizes an information system and so on that can automatically change a credit card number.

BRIEF DESCRIPTION OF DRAWINGS

FIG. 5 is a diagram showing a data structure of store information according to the same.

DESCRIPTION OF EMBODIMENT

Figure 1:
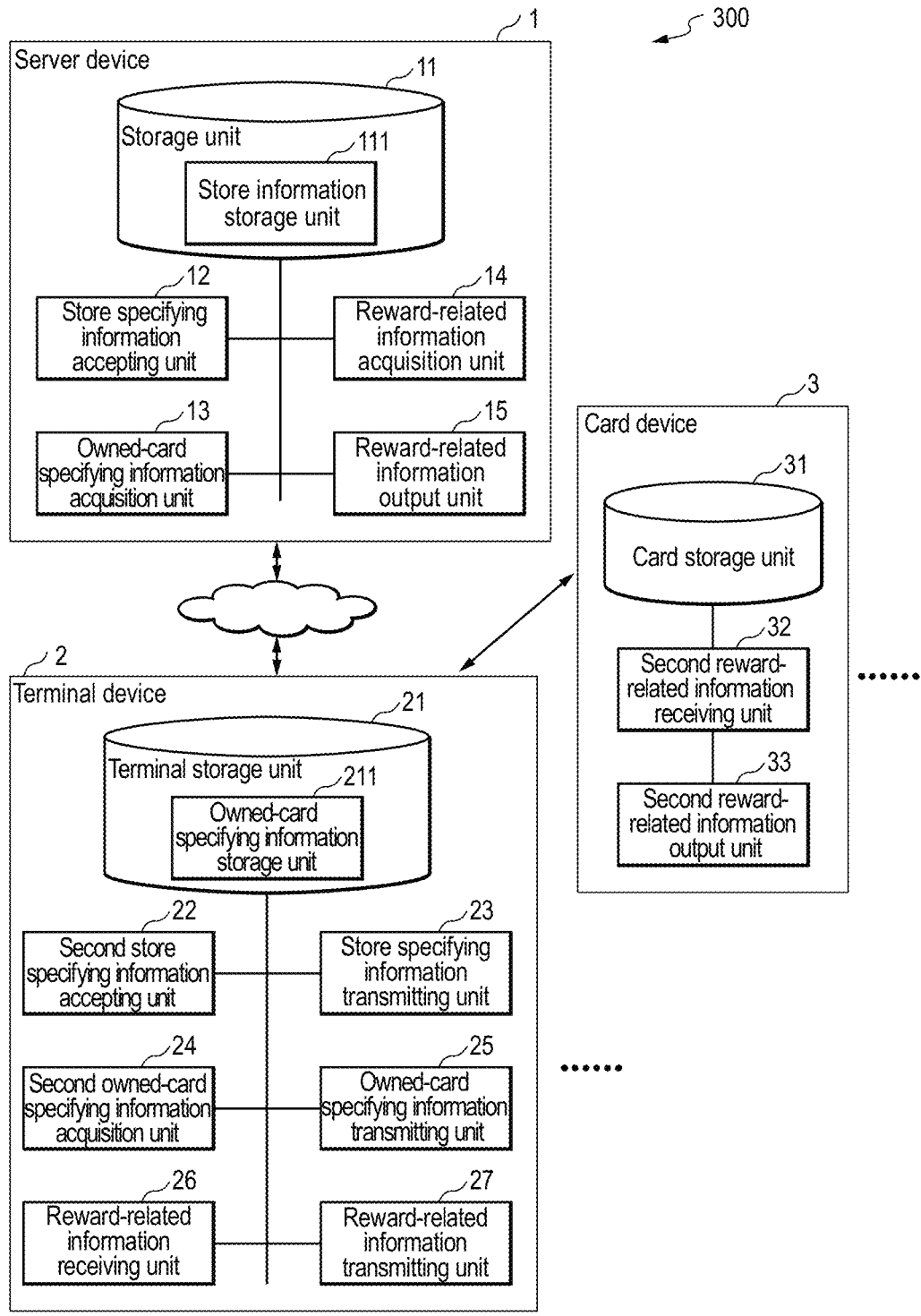
FIG. 1 is a block diagram for an information system according to a first embodiment.

The following describes embodiments of an information system and so on with reference to the drawings. Note that constituent elements or steps that are assigned the same reference numerals in the respective embodiments perform the same operations, and therefore redundant descriptions thereof may be omitted.

An information system according to any of the embodiments manages store information (including card information regarding two or more cards that are available at the store, and reward information regarding each card). Upon receiving store specifying information that specifies a store, the information system acquires owned-card specifying information that specifies two or more cards owned by a user, determines a store using the store specifying information, and acquires and outputs reward-related information that uses reward information corresponding to the two or more cards specified by the owned-card specifying information. Reward-related information is, for example, card information regarding a card that offers the highest reward. Alternatively, reward-related information may be two or more pieces of reward information (sorted according to the value of each reward). Note that reward information, reward-related information, and so on will be described below.

An information system 300 according to a first embodiment includes a server device 1, a terminal device 2, and a card device 3, and realizes the above-described functions according to a first role assignment in which the server device 1 plays the leading role. An information system 300A according to a second embodiment includes a server device 1A, a terminal device 2A, and a card device 3A, and realizes the above-described functions according to a second role assignment in which the terminal device 2A plays the leading role. An information system 300B according to a third embodiment includes a server device 1B and a card device 3B, and realizes the above-described functions according to a third role assignment in which the server device 1B plays the leading role.

First Embodiment

FIG. 1 is a block diagram for the information system 300 according to the present embodiment. The information system 300 includes a server device 1, one or more terminal devices 2, and one or more card devices 3. The one or more terminal devices 2 and the one or more card devices 3 typically correspond one-to-one to each other. In the following description, the "terminal device 2" is one terminal device 2 out of one or more terminal devices 2, and the "card device 3" is a card device 3 that constitutes a pair with the one terminal device 2.

The server device 1 and the terminal device 2 are connected via, for example, a network such as a LAN or the Internet, a communication network, or the like, so as to be able to communicate with each other. The terminal device 2 and the card device 3 are connected via short-range wireless communication such as Bluetooth (registered trademark), or tethered communication, so as to be able to communicate with each other. The server device 1 is realized using, for example, a general-purpose server, a cloud server, or the like. Note that the server device 1 may be of any type. The terminal device 2 is realized using, for example, a portable communication terminal such as a smartphone or a terminal device. Note that the terminal device 2 may be of any type. The card device 3 is realized using, for example, an IC card. The IC card includes, for example, an IC chip that includes a CPU, a memory, and so on, a communication module for performing short-range wireless communication or tethered communication, a display, and so on. Note that the card device 3 may be of any type.

The server device 1 includes a storage unit 11, a store specifying information accepting unit 12, an owned-card specifying information acquisition unit 13, a reward-related information acquisition unit 14, and a reward-related information output unit 15. The storage unit 11 includes a store information storage unit 111. The terminal device 2 includes a terminal storage unit 21, a second store specifying information accepting unit 22, a store specifying information transmitting unit 23, a second owned-card specifying information acquisition unit 24, an owned-card specifying information transmitting unit 25, a reward-related information receiving unit 26, and a reward-related information transmitting unit 27. The terminal storage unit 21 includes an owned-card specifying information storage unit 211. The card device 3 includes a card storage unit 31, a second reward-related information receiving unit 32, and a second reward-related information output unit 33. The card device 3 may include a communication unit (not shown) such as a short-range wireless communication unit that employs Bluetooth (registered trademark) or NFC, and a detection unit (not shown) such as an acceleration sensor or a gyro sensor.

The storage unit 11 included in the server device 1 may store various kinds of information. Various kinds of information are, for example, store information described below, identification information that identifies the server device 1, identification information that identifies the terminal device 2, and so on. These kinds of identification information are, for example, an IP address, a MAC address, or GPS. Any information that can identify a device may be employed, and such information may be of any type.

The store information storage unit 111 stores one or more pieces of store information. Store information is information regarding a store. A store is a shop that offers items or services (and may be an e-commerce shop). A store may be one shop or a company or the like that operates two or more shops. Also, a store may be a real shop that exists in the real world, or a virtual shop that is on the Internet. One or more pieces of store information each include, for example, a store identifier and two or more pieces of card information. A store identifier identifies a store. A store identifier is, for example, an ID assigned to a store, an address (an IP address, a MAC address, etc.) of a terminal installed in a store, such as a POS terminal, or the like. Card information is information regarding a card. Examples of cards include a credit card, a debit card, a prepaid card, a settlement card such as various kinds of electronic money cards, a membership card such as an airline mileage membership card, various kinds of store point cards, and so on, and cards may be of any type or kind. Cards typically entitle a user who uses them to a reward. However, cards that do not entitle the user to a reward may be employed. Two or more pieces of card information each include a card identifier that identifies the card, and reward information regarding a reward that is to be gained when the card is used. A reward is, for example, points, discount, a gift, a coupon, or the like. Reward information is information regarding a reward, and, for example, information that indicates "1 point per 100 yen", "5% off", "buy 5000 yen or more and receive a voucher worth 500 yen".

The store specifying information accepting unit 12 accepts store specifying information. The store specifying information is information specifying a store in which a user uses a card to purchase an item or a service. Store specifying information includes, for example, a store identifier, a location information that indicates the location of the store, and so on. Note that the store specifying information accepting unit 12 does not necessarily accept all of these kinds of store specifying information. Receiving is a concept including receiving information input from an input device such as a keyboard, a mouse, or a touch panel, receiving information transmitted via a tethered or wireless communication network, receiving information read out from a recording medium such as an optical disc, a magnetic disk, or a semiconductor memory, and so on.

The store specifying information accepting unit 12 typically receives store specifying information from the terminal device 2. However, the store specifying information accepting unit 12 may receive store specifying information from a card device 3 or an external device (a terminal installed in a store, such as a POS or CCT terminal), or accept it via an input device such as a touch panel. Store specifying information may be acquired from any source.

The owned-card specifying information acquisition unit 13 acquires owned-card specifying information. Owned-card specifying information is information that specifies two or more cards owned by a user who purchases an item or a service. The owned-card specifying information acquisition unit 13 typically acquires owned-card specifying information from the terminal device 2, but may receive owned-card specifying information from the card device 3, an external device (a cloud server or the like), or read out from the storage unit 11. Owned-card specifying information may be acquired from any source.

The reward-related information acquisition unit 14 uses two or more pieces of reward information included in card information regarding two or more cards corresponding to two or more pieces of card information included in store information regarding a store specified by store specifying information, out of two or more cards specified by owned-card specifying information, to acquire reward-related information related to reward information regarding two or more cards that the user can use at the store.

Here, two or more cards corresponding to two or more pieces of card information included in store information regarding a store specified by store specifying information, out of two or more cards specified by owned-card specifying information, are two or more cards that are available at the store, out of the two or more cards owned by the user. Acquiring reward-related information related to reward information regarding two or more cards that the user can use at the store, by using two or more pieces of reward information included in card information regarding such two or more cards, may be acquiring reward-related information including some or all of two or more pieces of reward information included in card information regarding the two or more cards, or acquiring reward-related information including some or all of two or more card identifiers included in card information regarding two or more cards, or acquiring reward-related information including all or some of two or more pairs, each consisting of a card identifier and reward information, included in reward-related information regarding the two or more cards.

Reward-related information may be a card identifier of a card that offers the highest reward, for example, or preferably include the card identifier of a card that offers the highest reward and reward information regarding the card (reward information corresponding to the card identifier). Alternatively, reward-related information may be reward information regarding two or more cards, or preferably pieces of reward information regarding two or more cards, sorted in descending order of the values of the respective rewards. The content of reward-related information is not limited as long as reward-related information is related to reward information regarding two or more cards that the user can use at a store.

The reward-related information acquisition unit 14 may, for example, use reward information regarding two or more cards that the user can use at the store, to acquire reward-related information that specifies a card corresponding to reward information that indicates the highest reward, based on a predetermined method. The predetermined method is, for example, comparing two or more cards in terms of discount ratio, yield ratio, or points that the user can receive. Note that a yield ratio is the ratio of the value of a reward to the amount paid. For example, if a user pays one thousand yen and receives ten points, and these ten points can be used as ten yen at the next shopping, the yield ratio is 1%.

When comparing two or more different kinds of reward information, the reward-related information acquisition unit 14 needs to convert the two or more pieces of reward information into pieces of reward information that are based on a common value criterion, and compare the two or more pieces of reward information resulting from the conversion. The common value criterion is, for example, a monetary value. Alternatively, for example, if the different kinds of rewards are points that are different in the value per point, and both kinds of points are exchangeable for common target points (e.g. a specific airline's miles), the common value criterion may be the value in terms of the common target points (the number of miles). Details will be described below based on specific examples.

The reward-related information acquisition unit 14 may, for example, use reward information regarding two or more cards that the user can use at the store, to acquire ranks of the two or more pieces of reward information, based on a predetermined method, and acquire reward-related information that specifies the ranks. The highest reward may be the highest reward that is based on one method, or two or more kinds of highest rewards that are based on different methods. The ranks may be based on discount ratios, yield ratios, points (e.g. the number of miles resulting from the conversion), and so on. The ranks may be ranks that are based on one method, two or more kinds of ranks that are based on another method, or overall ranks based on two or more kinds of ranks.

The reward-related information output unit 15 outputs the reward-related information acquired by the reward-related information acquisition unit 14. Outputting is a concept including, for example, displaying on a display, outputting audio from a speaker, transmitting to external devices (such as the terminal device 2 and the card device 3), printing using a printer, storing on a recording medium (e.g. the storage unit 11), handing over the result of processing to another processing device or another program, and so on. Output performed by the reward-related information output unit 15 is typically transmission to the terminal device 2, but is not limited in such a way.

The reward-related information output unit 15 typically transmits the reward-related information acquired by the reward-related information acquisition unit 14 to the terminal device 2. However, reward-related information may be transmitted to, for example, the card device 3 or another device (e.g. a terminal installed in a store), and the destination of transmission is not limited.

The terminal storage unit 21 included in the terminal device 2 may store various kinds of information. Various kinds of information are, for example, the above-described owned-card specifying information, identification information that identifies the terminal device 2, identification information that identifies the server device 1, identification information that identifies the card device 3, and so on.

The owned-card specifying information storage unit 211 stores owned-card specifying information.

The second store specifying information accepting unit 22 accepts the above-described store specifying information. For example, the store specifying information accepting unit 12 may receive store specifying information from a terminal installed in a store, such as a POS terminal, or acquire store specifying information based on positional information received from a GPS receiver or a wireless LAN access point, or accept store specifying information input by a user via an input device such as a touch panel, and the source of, and the method for acquiring the store specifying information are not limited. When store specifying information is acquired based on positional information, it is preferable that pairs each consisting of a store identifier and a piece of positional information are stored in the storage unit 11. However, the pairs each consisting of a store identifier and a piece of positional information may be stored in the storage unit 11 of the server device 1, for example. If this is the case, it suffices if the second store specifying information accepting unit 22 acquires positional information from a GPS receiver or a wireless LAN access point.

The store specifying information transmitting unit 23 transmits the store specifying information accepted by the second store specifying information accepting unit 22 to the server device 1.

The second owned-card specifying information acquisition unit 24 acquires owned-card specifying information from the owned-card specifying information storage unit 211.

The owned-card specifying information transmitting unit 25 transmits the owned-card specifying information acquired by the second owned-card specifying information acquisition unit 24 to the server device 1.

The reward-related information receiving unit 26 receives reward-related information from the server device 1 in response to the owned-card specifying information transmitting unit 25 transmitting owned-card specifying information to the server device 1.

The reward-related information transmitting unit 27 transmits the reward-related information received by the reward-related information receiving unit 26 to the card device 3.

The card storage unit 31 included in the card device 3 may store various kinds of information. Various kinds of information are, for example, identification information that identifies the card device 3, identification information that identifies the server device 1, and so on.

The second reward-related information receiving unit 32 receives reward-related information from the terminal device 2.

The second reward-related information output unit 33 outputs the reward-related information received by the second reward-related information receiving unit 32. The second reward-related information output unit 33 typically displays reward-related information on a display, but may output reward-related information as audio via a speaker, and how reward-related information is output is not limited.

If the card device 3 includes a communication means and a detection means, they operate as follows. The detection means detects a user operation, e.g. detects that the card device 3 has been shaken or moved by a user. Upon the detection means detecting the operation, the communication means transmits, to the terminal device 2, an instruction to transmit store specifying information (e.g. positional information) to the server device 1. Note that the terminal device receives the instruction from the card device 3, acquires store specifying information, and transmits the store specifying information to the server device 1. That is, a user operation such as holding the card device 3 in his/her hand, shaking the card device 3, or the like triggers the card device 3 to transmit store specifying information to the server device 1.

The storage unit 11, the store information storage unit 111, the terminal storage unit 21, the owned-card specifying information storage unit 211, and the card storage unit 31 described above (and a card storage unit 31B described below) are preferably non-volatile recording medium such as a hard disk or a flash memory, but can be realized using a volatile recording medium such as a RAM.

Also, a process through which various kinds of information are stored in the storage unit 11 and so on is not limited. For example, information may be stored in the storage unit 11 and so on via a detachable recording medium such as a CD-ROM or a memory card, or information transmitted via a network, a communication network, or the like may be stored in the storage unit 11 and so on, or information input via an input device may be stored in the storage unit 11 and so on. The input device may be any device, e.g. a keyboard, a mouse, or a touch panel.

The store specifying information accepting unit 12, the owned-card specifying information acquisition unit 13, the reward-related information acquisition unit 14, the reward-related information output unit 15, the second store specifying information accepting unit 22, the store specifying information transmitting unit 23, the second owned-card specifying information acquisition unit 24, the owned-card specifying information transmitting unit 25, the reward-related information receiving unit 26, the reward-related information transmitting unit 27, the second reward-related information receiving unit 32, and the second reward-related information output unit 33 (and a card information acquisition unit 16, a card information transmitting unit 17, a card information receiving unit 28, an owned-card specifying information acquisition unit 13A, a reward-related information acquisition unit 14A, a reward-related information output unit 15A, a reward-related information receiving unit 32A, a reward-related information acquisition unit 14B, and a reward-related information output unit 15B) can typically be realized using a MPU, a memory, and so on. Processing procedures that are performed by the store specifying information accepting unit 12 and so on are typically realized using software, and the software is recorded on a recording medium such as a ROM. However, they may be realized using hardware (dedicated circuits).

The store specifying information accepting unit 12, the owned-card specifying information acquisition unit 13, the reward-related information acquisition unit 14, the second store specifying information accepting unit 22, and the second owned-card specifying information acquisition unit 24 (and the card information acquisition unit 16, the card information receiving unit 28, the owned-card specifying information acquisition unit 13A, the reward-related information acquisition unit 14A, the reward-related information receiving unit 32A, and the reward-related information acquisition unit 14B) may or may not include one or more pieces of hardware out of an input device, a communication module, and a broadcast receiving module. The receiving function and the accepting function of the store specifying information receiving unit 12 and so on can be realized using driver software for the one or more pieces of hardware, or using the one or more pieces of hardware and the driver software for them.

The store specifying information transmitting unit 23, the reward-related information transmitting unit 27, and the owned-card specifying information transmitting unit 25 (and the card information transmitting unit 17) may or may not include one or more pieces of hardware out of a communication module and a broadcast module. The transmitting function of the store specifying information transmitting unit 23 and so on can be realized using driver software for the one or more pieces of hardware, or using the one or more pieces of hardware and the driver software for them.

The reward-related information output unit 15, the second reward-related information output unit 33 (and the reward-related information output unit 15A and the reward-related information output unit 15B) may or may not include one or more pieces of hardware out of an output device, a communication module, and a broadcast module. The outputting function of the reward-related information output unit 15 and so on can be realized using driver software for the one or more pieces of hardware, or using the one or more pieces of hardware and the driver software for them.

Next, operations of the information system 300 will be described with reference to the flowcharts shown in FIGS. 2 to 4.

Figure 2:
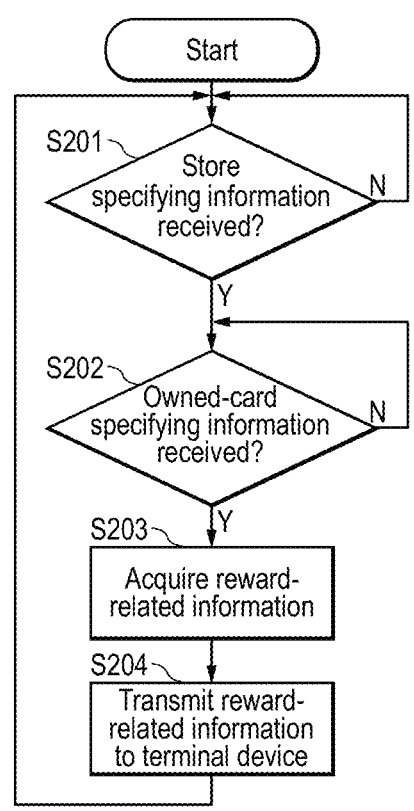
FIG. 2 shows a flowchart for operations of a server device 1 according to the same.

FIG. 2 shows a flowchart for operations of the server device 1.

Step S201: The store specifying information accepting unit 12 determines whether or not it has received store specifying information from the terminal device 2. If the store specifying information accepting unit 12 determines that it has received store specifying information from the terminal device 2, processing proceeds to step S202, and if the store specifying information accepting unit 12 determines not, processing returns to step S201.

Step S202: The owned-card specifying information acquisition unit 13 determines whether or not it has received owned-card specifying information from the terminal device 2. If the owned-card specifying information acquisition unit 13 determines that it has received owned-card specifying information from the terminal device 2, processing proceeds to step S203, and if not, processing returns to step S202.

Step S203: The reward-related information acquisition unit 14 uses two or more pieces of reward information included in card information regarding two or more cards corresponding to two or more pieces of card information included in store information regarding a store specified by the store specifying information received by the store specifying information accepting unit 12, out of two or more cards specified by the owned-card specifying information received by the owned-card specifying information acquisition unit 13, to acquire reward-related information related to reward information regarding two or more cards that the user can use at the store, from the store information storage unit 111. Note that if the reward-related information acquisition unit 14 cannot specify one store based on the store specifying information received in step S201, the reward-related information output unit 15 may acquire two or more pieces of store information regarding two or more stores that can be acquired based on the store specifying information. Then, the reward-related information output unit 15 or an output unit that is not shown may transmit two or more pieces of store information to the terminal device 2. In such a case, information (e.g. a store identifier) regarding one store selected by the user on the screen of the terminal device 2 is transmitted from the terminal device 2 to the server device 1. Then, a receiving unit that is not shown of the server device 1 receives the information regarding the one store. Then, the reward-related information acquisition unit 14 acquires, from the store information storage unit 111, reward-related information related to reward information included in card information that is information regarding two or more cards included in store information regarding one store corresponding to the information regarding the one store, and is information regarding two or more cards that the user can use at the store.

Step S204: The reward-related information output unit 15 transmits the reward-related information acquired by the reward-related information acquisition unit 14 to the terminal device 2. Thereafter, processing returns to step S201.

Note that the processing shown in FIG. 2 starts in response to the server device 1 being powered on or a program being started up, and ends in response to the server device 1 being powered off or the program ending, for example.

Note that the processing shown in FIG. 2 is performed on one terminal device 2, and if there are two or more terminal devices 2, the same processing is performed on each of the terminal devices 2. That is, the server device 1 may perform two or more sequences of the same processing as in FIG. 2 in parallel or through time division.

Figure 3:
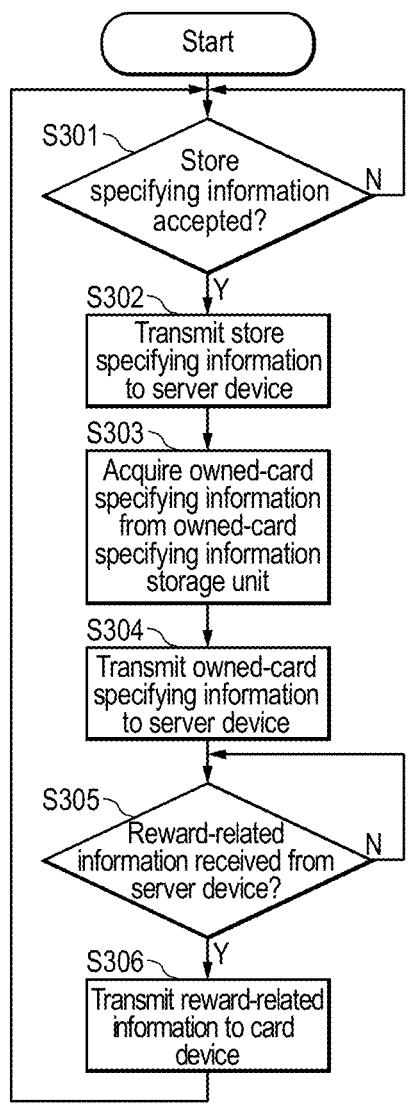
FIG. 3 shows a flowchart for operations of a terminal device 2 according to the same.

FIG. 3 shows a flowchart for operations of the terminal device 2.

The terminal storage unit 21 stores, for example, identification information that identifies the terminal device 2, identification information that identifies the server device 1, identification information that identifies the card device 3, and so on. The owned-card specifying information storage unit 211 stores owned-card specifying information.

Step S301: The second store specifying information accepting unit 22 determines whether or not it has accepted store specifying information. For example, store specifying information is broadcasted from a terminal device provided in a store, and upon receiving such store specifying information, the second store specifying information accepting unit 22 determines that it has accepted store specifying information. Alternatively, the second store specifying information accepting unit 22 may accept store specifying information input by the user via an input device such as a touch panel. If t the second store specifying information accepting unit 22 determines that it has accepted store specifying information, processing proceeds to step S302, and if not, processing returns to step S301.

Step S302: The store specifying information transmitting unit 23 transmits the store specifying information accepted by the second store specifying information accepting unit 22 to the server device 1. Note that, after the store specifying information transmitting unit 23 has transmitted store specifying information to the server device 1, a receiving unit that is not shown of the terminal device 2 may receive information regarding two or more stores corresponding to the store specifying information. In such a case, an output unit that is not shown of the terminal device 2 outputs information regarding two or more stores (e.g. the names of the stores, the store identifiers, and so on). Then, an accepting unit that is not shown accepts selection of information regarding one store from among pieces of information regarding the two or more stores. Then, a transmitting unit that is not shown transmits the information regarding the one store to the server device 1.

Step S303: The second owned-card specifying information acquisition unit 24 acquires owned-card specifying information from the owned-card specifying information storage unit 211.

Step S304: The owned-card specifying information transmitting unit 25 transmits the owned-card specifying information acquired by the second owned-card specifying information acquisition unit 24 to the server device 1.

Step S305: The reward-related information receiving unit 26 determines whether or not it has received reward-related information from the server device 1. If the reward-related information receiving unit 26 determines that it has received reward-related information, processing proceeds to step S306, and if not, processing returns to step S305. Note that the server device 1 acquires reward-related information using information regarding one store transmitted by a transmitting unit that is not shown, and transmits the reward-related information to the terminal device 2.

Step S306: The reward-related information transmitting unit 27 transmits the reward-related information received by the reward-related information receiving unit 26 to the card device 3. Thereafter, processing returns to step S301.

Note that the processing according to the flowchart shown in FIG. 3 starts in response to the terminal device 2 being powered on or a program being started up, and ends in response to the terminal device 2 being powered off or the program ending, for example.

Figure 4:
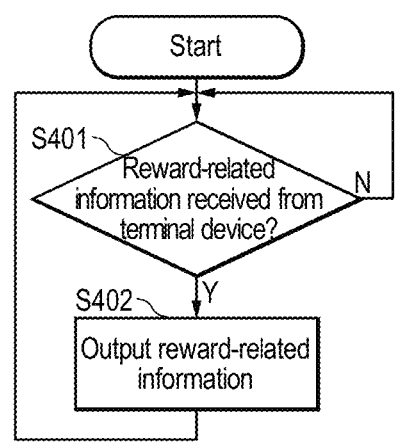
FIG. 4 shows a flowchart for operations of a card device 3 according to the same.

FIG. 4 shows a flowchart for operations of the card device 3.

Step S401: The second reward-related information receiving unit 32 determines whether or not it has received reward-related information from the terminal device 2. If the second reward-related information receiving unit 32 determines that it has received reward-related information from the terminal device 2, processing proceeds to step S402, and if not, processing returns to step S401.

Step S402: The second reward-related information output unit 33 outputs the reward-related information received by the second reward-related information receiving unit 32 via an output device such as a display. Thereafter, processing returns to step S401.

Note that the processing shown in FIG. 4 starts in response to the card device 3 being powered on, and ends in response to the card device 3 being powered off, for example.

The following describes specific examples of operations of the information system 300 according to the present embodiment. Note that the following specific examples are merely illustrative, can be variously modified, and do not limit the present invention.

Specific Example 1

A user who carries the terminal device 2 and the card device 3 with him/her has visited a store (e.g. a store AAA), and is about to purchase an item or a service. A terminal such as a POS terminal is installed in the store, and store specifying information (such as a store identifier "AAA") is broadcasted from the terminal. The user has two or more cards (e.g. a card aaa, a card bbb, and so on), and wishes to use one of the cards to purchase an item or the like, but is wondering which card he/she should use.

The store information storage unit 111 of the server device 1 stores one or more pieces of store information as shown in FIG. 5, for example. Each of the one or more pieces of store information includes an ID that identifies the piece of store information (e.g. "1", "2", and so on), a store identifier, and two or more pieces of card information (e.g. card information 1, card information 2, and so on). Each of the two or more pieces of card information includes a card identifier and reward information.

For example, store information 1 includes a store identifier "AAA", and card information 1, card information 2, and so on regarding two or more cards (a card aaa, a card bbb, and so on) that are available at a store AAA identified by the store identifier. Card information 1 included in store information 1 includes a card identifier "aaa" and reward information "1 point per 100 yen". Card information 2 included in store information 2 includes a card identifier "bbb" and reward information "2 points per 100 yen". Similarly, store information 2 includes a store identifier "BBB", and card information 1, card information 2, and so on regarding two or more cards (a card ccc, a card ddd, and so on) that are available at a store BBB identified by the store identifier. Card information 1 included in store information 2 includes a card identifier "bbb" and reward information "5% off". Card information 2 included in store information 2 includes a card identifier "ddd" and reward information "100 yen discount".

The owned-card specifying information storage unit 211 of the terminal device 2 stores owned-card specifying information that specifies two or more cards owned by the user. Owned-card specifying information includes a user identifier that identifies the user, two or more card identifiers (e.g. "aaa", "bbb", and so on) specifying two or more cards owned by the user identified by the user identifier.

Then, the user powers on the terminal device 2 and the card device 3. As a result, in the terminal device 2, the second store specifying information accepting unit 22 receives the store specifying information broadcasted by the terminal in the store AAA, and the store specifying information transmitting unit 23 transmits the store specifying information to the server device 1. Next, the second owned-card specifying information acquisition unit 24 acquires owned-card specifying information from the owned-card specifying information storage unit 211, and the owned-card specifying information transmitting unit 25 transmits the owned-card specifying information to the server device 1.

In the server device 1, the store specifying information accepting unit 12 receives the store specifying information transmitted from the terminal device 2, and then the owned-card specifying information acquisition unit 13 receives the owned-card specifying information transmitted from the terminal device 2. The reward-related information acquisition unit 14 acquires, from the store information storage unit 111, reward-related information related to reward information regarding two or more cards that the user can use at the store AAA, using two or more pieces of reward information (i.e. reward information "1 point per 100 yen" corresponding to the card identifier "aaa", reward information "2 points per 100 yen" corresponding to the card identifier "bbb", and so on) included in card information regarding two or more cards corresponding to two or more pieces of card information included in store information (i.e. store information 1) regarding the store AAA specified by the received store specifying information, out of two or more cards (i.e. the card aaa, the card bbb, and so on) specified by the received owned-card specifying information.

For example, the reward-related information acquisition unit 14 may acquire the card identifier of the card with which the user can receive the highest reward (e.g. the card identifier "bbb" corresponding to reward information "2 points per 100 yen") out of the two or more pieces of reward information (i.e. reward information "1 point per 100 yen" corresponding to the card identifier "aaa" and reward information "2 points per 100 yen" corresponding to the card identifier "bbb"). Alternatively, the reward-related information acquisition unit 14 may acquire ranks of the two or more pieces of reward information based on the values of the rewards, and sort the two or more pieces of reward information according to the acquired ranks. The reward-related information output unit 15 transmits the reward-related information thus acquired by the reward-related information acquisition unit 14 to the terminal device 2.

In the terminal device 2, the reward-related information receiving unit 26 receives the reward-related information transmitted from the server device 1, and the reward-related information transmitting unit 27 transmits the reward-related information received by the reward-related information receiving unit 26 to the card device 3.

In the card device 3, the second reward-related information receiving unit 32 receives the reward-related information transmitted from the terminal device 2, and the second reward-related information output unit 33 outputs the reward-related information received by the second reward-related information receiving unit 32 via an output device such as a display.

Figure 6:
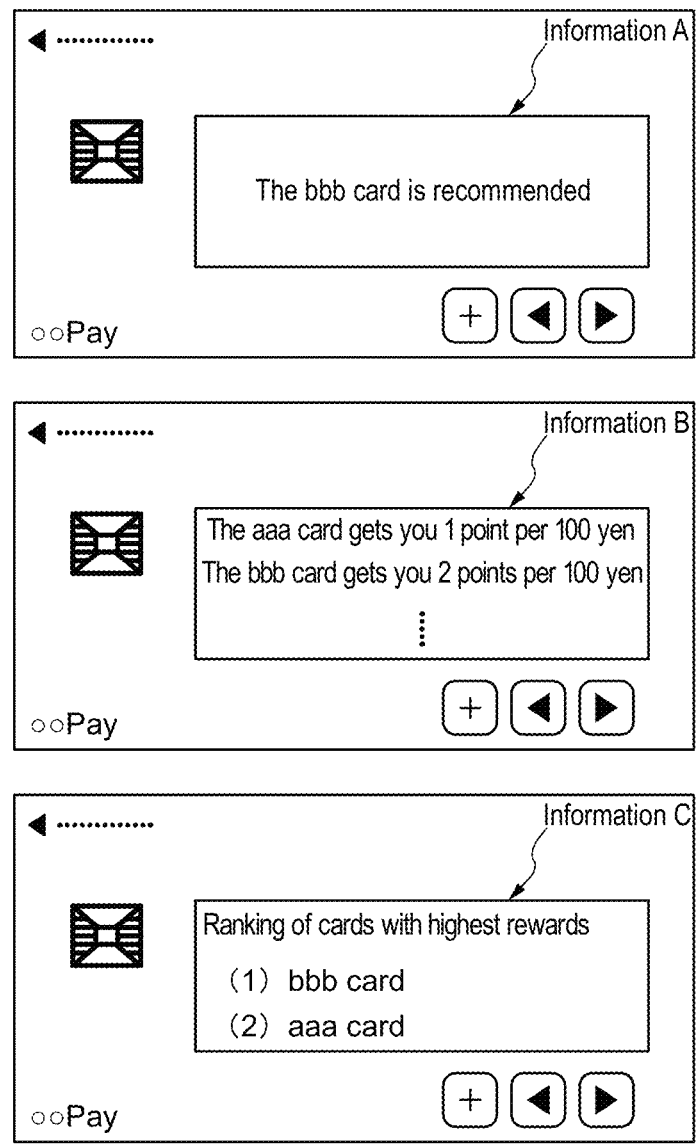
FIG. 6 is a diagram showing examples of outputs of reward-related information.

Thus, the display of the card device 3 displays, as shown in FIG. 6, for example, information A "the bbb card is recommended", which includes the card identifier of the card with which the user can receive the highest reward (e.g. the card identifier "bbb" corresponding to reward information "2 points per 100 yen"), and the user can receive the highest reward if the user purchases an item using the card identified by the card identifier included in the information A thus displayed. Alternatively, the display may display information B (the aaa card gets you 1 point per 100 yen, the bbb card gets you 2 points per 100 yen, . . . ", which includes two or more pairs each consisting of a card identifier and reward information, and the user may determine which card to use by examining the details of the rewards that the user can receive with the respective cards, based on the two or more pairs. Alternatively, the display may display information C "Ranking of cards with highest rewards: (1) the bbb card; (2) the aaa card, . . . ", which includes two or more card identifiers sorted in descending order of the values of the respective rewards, and the user may determine which card to use, considering the ranking of the rewards.

However, although the reward of the card aaa is 1 point per 100 yen and the reward of the card bbb is 2 points per 100 yen, if the value of 1 point is different from each other, it is difficult to simply comparing the rewards with each other, and the reward-related information acquisition unit 14 needs to convert the rewards based on a common value criterion to compare them with each other. For example, if points of the card aaa can be exchanged for miles of a specific airline at a ratio of 1:1, and points of the card bbb can be exchanged for miles of the same airline at a ratio of 4:1, the reward-related information acquisition unit 14 converts both rewards to miles, which are values based on a common value criterion. That is, the reward-related information acquisition unit 14 may convert reward information regarding the card aaa to "1 mile per 100 yen", and convert reward information regarding the card aaa to "0.5 miles per 100 yen", and acquire reward-related information such as "To save up miles, the aaa card is recommended", based on the result of comparison between the pieces of reward information resulting from the conversion.

Specific Example 2

A user is about to purchase an item or a service at the store BBB. The card ccc, the card ddd, and so on are available at the store BBB. The user has the card ccc and the card ddd with him/her. Also in this case, the same processing as described above is performed in the information system 300, and the reward-related information acquisition unit 14 acquires, from the store information storage unit 111, reward-related information related to reward information regarding the card ccc and the card ddd, which are the cards that the user can use at the store BBB, using reward information "5% off" corresponding to the card identifier "ccc", and reward information "100 yen discount" corresponding to the card identifier "ddd".

However, it is impossible to simply compare reward information "5% off" regarding the card ccc and reward information "100 yen discount" regarding the card ddd with each other. Therefore, the reward-related information acquisition unit 14 converts both rewards to monetary values, which are values based on a kind of common value criterion, and compares the monetary values with each other. The reward-related information acquisition unit 14 may multiply reward information, which indicates the discount rate, by the amount of purchase, to convert the reward information to reward information that indicates a monetary value. For example, if the amount of purchase is 1000 yen, the reward-related information acquisition unit 14 converts reward information regarding the card ccc to "50 yen off", and if the amount of purchase is 3000 yen, the reward-related information acquisition unit 14 converts the reward information to "150 yen off".

Therefore, the reward-related information acquisition unit 14 can acquire reward-related information that varies depending on the amount of purchase. That is, if the amount of purchase is 1000 yen (lower than 2000 yen), the reward-related information acquisition unit 14 may acquire reward-related information saying "The bbb card is recommended", for example, and if the amount of purchase is 3000 yen (higher than 2000 yen), the reward-related information acquisition unit 14 may acquire reward-related information saying "The aaa card is recommended", for example. Also, if the amount of purchase is 2000 yen, the reward-related information acquisition unit 14 may acquire reward-related information saying "The aaa card and the bbb card are recommended", for example, and the reward-related information acquisition unit 14 may acquire reward-related information saying "If the amount of purchase is lower than 2000 yen, the bbb card is recommended, and if the amount of purchase is 2000 yen or higher, the aaa card is recommended", for example.

As described above, according to the present embodiment, with the information system 300 that includes: a store information storage unit 111 in which one or more pieces of store information are stored, each piece of store information including a store identifier that identifies a store, and two or more pieces of card information each including a card identifier that identifies a card that is available at a store and reward information regarding a reward that is to be gained when a card is used; a store specifying information accepting unit 12 that accepts store specifying information that specifies a store at which a card is used when an item or a service is purchased; a reward-related information acquisition unit 14 that uses two or more pieces of reward information included in card information regarding two or more cards corresponding to two or more pieces of card information included in store information regarding a store specified by the store specifying information, out of two or more cards specified by owned-card specifying information that is stored information that specifies two or more cards owned by a user who purchases an item or a service, to acquire reward-related information related to reward information regarding two or more cards that the user can use at the store; and a reward-related information output unit 15 that outputs reward-related information acquired by the reward-related information acquisition unit 14, the user is assisted to use a card with which the user can receive a reward that is beneficial for the user, and thus the user can easily select a card with which the user can receive a beneficial reward, from among multiple cards that are available at the store and are owned by the user.

Also, in the above-described information system 300, the reward-related information acquisition unit 14 uses reward information regarding two or more cards that the user can use at the store, to acquire reward-related information that specifies a card corresponding to reward information that indicates the highest reward, based on a predetermined method. As a result, the user can easily select a card with which the user can receive the most beneficial reward. That is, the user can select a card such that the user can receive the highest reward at each store.

Also, in the above-described information system 300, the reward-related information acquisition unit 14 acquires the ranks of two or more pieces of reward information based on a predetermined method, using reward information regarding two or more cards that the user can use at the store, to acquire reward-related information that specifies the ranks. As a result, the user can select a card that is to be used, using reward-related information that specifies the ranks of the two or more pieces of reward information and considering the ranks of the rewards as well.

Also, the above-described information system 300 includes: a server device 1; a terminal device 2; and a card device 3, the server device 1 including: the store information storage unit 111; the store specifying information accepting unit 12 that receives the store specifying information from the terminal device 2; an owned-card specifying information acquisition unit 13 that receives the owned-card specifying information from the terminal device 2; the reward-related information acquisition unit 14 that uses two or more pieces of reward information included in card information regarding two or more cards corresponding to two or more pieces of card information included in store information regarding a store specified by the store specifying information received by the owned-card specifying information acquisition unit 13, out of two or more cards specified by the owned-card specifying information received by the store specifying information accepting unit 12, to acquire reward-related information related to reward information regarding two or more cards that the user can use at the store; and the reward-related information output unit 15 that outputs the reward-related information acquired by the reward-related information acquisition unit 14 to the terminal device 2, the terminal device 2 including: an owned-card specifying information storage unit 211 in which the owned-card specifying information is stored; a second store specifying information accepting unit 22 that accepts the store specifying information; a store specifying information transmitting unit 23 that transmits the store specifying information accepted by the second store specifying information accepting unit 22 to the server device 1; a second owned-card specifying information acquisition unit 24 that acquires owned-card specifying information from the owned-card specifying information storage unit 211; an owned-card specifying information transmitting unit 25 that transmits the owned-card specifying information acquired by the second owned-card specifying information acquisition unit 24 to the server device 1; a reward-related information receiving unit 26 that receives the reward-related information from the server device 1; and a reward-related information transmitting unit 27 that transmits the reward-related information received by the reward-related information receiving unit 26 to the card device 3, and the card device 3 including: a second reward-related information receiving unit 32 that receives the reward-related information from the terminal device; and a second reward-related information output unit 33 that outputs the reward-related information received by the second reward-related information receiving unit 32. Thus, it is possible to realize an information system 300 that includes the server device 1, the terminal device 2, and the card device 3, and in which the server device 1 plays the leading role and assists the user to use a card with which the user can receive a beneficial reward.

Also, due to the server device 1 including: the store information storage unit 111 in which one or more pieces of store information are stored, each piece of store information including a store identifier that identifies a store, and two or more pieces of card information each including a card identifier that identifies a card that is available at a store and reward information regarding a reward that is to be gained when a card is used; the store specifying information accepting unit 12 that receives store specifying information that specifies a store at which a card is used when an item or a service is purchased; the reward-related information acquisition unit 14 that uses two or more pieces of reward information included in card information regarding two or more cards corresponding to two or more pieces of card information included in store information regarding a store specified by the store specifying information, out of two or more cards specified by owned-card specifying information that is stored information that specifies two or more cards owned by a user who purchases an item or a service, to acquire reward-related information related to reward information regarding two or more cards that the user can use at the store; and the reward-related information output unit 15 that transmits reward-related information acquired by the reward-related information acquisition unit 14, the server 1 is realized so as to assist the user to use a card with which the user can receive a reward that is beneficial for the user.

Furthermore, processing according to the present embodiment may be realized using software. This software may be distributed via software downloading or the like. Also, this software may be recorded on a recording medium such as a CD-ROM and distributed. Note that this applies to the other embodiments in the present description.

Software that realizes the information system 300 according to the present embodiment is a program that causes a computer to function as the above-described units, and is, for example, the following program. That is, a store information storage unit 111 is stored in a recording medium that can be accessed by a computer, and one or more pieces of store information are stored in the store information storage unit 111. Each piece of store information includes: a store identifier that identifies a store; and two or more pieces of card information each including a card identifier that identifies a card that is available at a store and reward information regarding a reward that is to be gained when a card is used. The program causes the computer to function as: a store specifying information accepting unit 12 that accepts store specifying information that specifies a store at which a card is used when an item or a service is purchased; an owned-card specifying information acquisition unit 13 that acquires owned-card specifying information that specifies two or more cards owned by a user who purchases an item or a service; a reward-related information acquisition unit 14 that uses two or more pieces of reward information included in card information regarding two or more cards corresponding to two or more pieces of card information included in store information regarding a store specified by the store specifying information, out of two or more cards specified by owned-card specifying information that specifies two or more cards owned by a user who purchases an item or a service, to acquire reward-related information related to reward information regarding two or more cards that the user can use at the store; and a reward-related information output unit 15 that outputs reward-related information acquired by the reward-related information acquisition unit 14.

Software that realizes the server device 1 according to the present embodiment is, for example, the following program. That is, a store information storage unit 111 is stored in a recording medium that can be accessed by a computer, and one or more pieces of store information are stored in the store information storage unit 111. Each piece of store information includes: a store identifier that identifies a store; and two or more pieces of card information each including a card identifier that identifies a card that is available at the store and reward information regarding a reward that is to be gained when the card is used. The program causes the computer to function as: a store specifying information accepting unit 12 that receives store specifying information that specifies a store at which a card is used when an item or a service is purchased; an owned-card specifying information acquisition unit 13 that acquires owned-card specifying information that specifies two or more cards owned by a user who purchases an item or a service; a reward-related information acquisition unit 14 that uses two or more pieces of reward information included in card information regarding two or more cards corresponding to two or more pieces of card information included in store information regarding a store specified by the store specifying information, out of two or more cards specified by owned-card specifying information that is stored information that specifies two or more cards owned by a user who purchases an item or a service, to acquire reward-related information related to reward information regarding two or more cards that the user can use at the store; and a reward-related information output unit 15 that transmits reward-related information acquired by the reward-related information acquisition unit 14.

Note that, in the present embodiment, the server device 1 manages store information, and the server device 1 receives store specifying information that specifies a store, and owned-card specifying information that specifies two or more cards owned by a user, from the terminal device 2, determines a store using the store specifying information, acquires reward-related information that uses reward information corresponding to the two or more cards specified by the owned-card specifying information out of cards that are available at the store, and transmits the reward-related information to the terminal device 2, whereas the terminal device 2 manages owned-card specifying information, and the terminal device 2 accepts store specifying information, transmits the store specifying information and the owned-card specifying information to the server device 1, receives the reward-related information from the server device 1, and transmits the reward-related information to the terminal device 2, and the card device 3 receives the reward-related information from the terminal device 2, and outputs the reward-related information. However, reward-related information may be acquired by the terminal device 2 or the card device 3, and the roles to be played by the three devices may be interchanged as appropriate.

Second Embodiment

Figure 7:
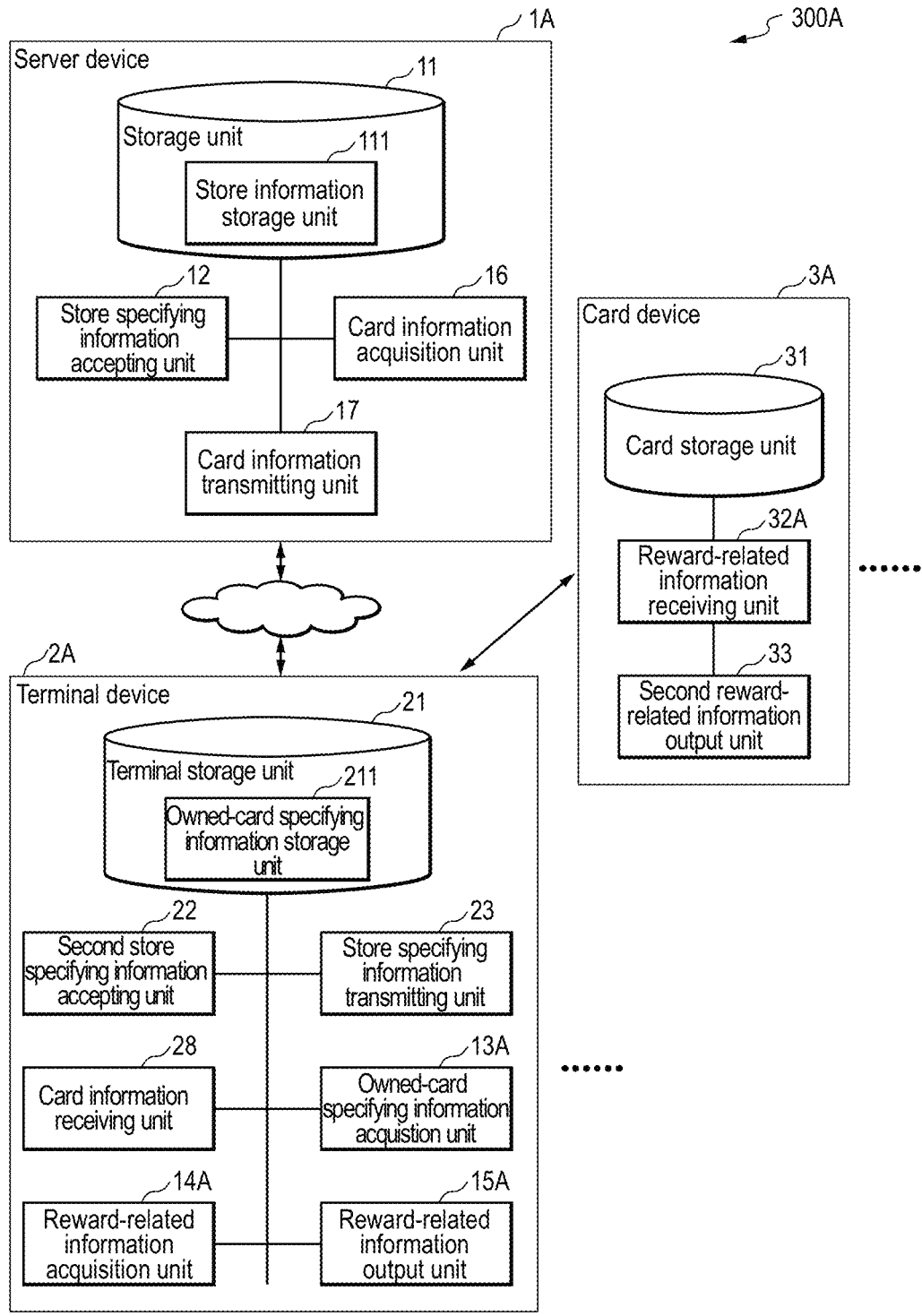
FIG. 7 is a block diagram for an information system according to a second embodiment.

FIG. 7 is a block diagram for the information system 300A according to the present embodiment. The information system 300A includes a server device 1A, one or more terminal devices 2A, and one or more card devices 3A. Note that constituent elements and steps indicated by reference numerals with an appendix "A" are different from those in the first embodiment in their internal configurations and some operations, and descriptions of the features that they have in common will be omitted or simplified.

The server device 1A includes a storage unit 11, a store specifying information accepting unit 12, a card information acquisition unit 16, and a card information transmitting unit 17. The storage unit 11 includes a store information storage unit 111. The terminal device 2A includes a terminal storage unit 21, a second store specifying information accepting unit 22, a store specifying information transmitting unit 23, a card information receiving unit 28, an owned-card specifying information acquisition unit 13A, a reward-related information acquisition unit 14A, and a reward-related information output unit 15A. The terminal storage unit 21 includes an owned-card specifying information storage unit 211. The card device 3A includes a reward-related information receiving unit 32A and a second reward-related information output unit 33.

The card information acquisition unit 16 included in the server device 1A acquires, from the store information storage unit 111, two or more pieces of card information corresponding to the store specifying information received by the store specifying information accepting unit 12. The card information transmitting unit 17 transmits the two or more pieces of card information acquired by the card information acquisition unit 16 to the terminal device 2A.

The card information receiving unit 28 included in the terminal device 2A receives two or more pieces of card information from the server device 1A in response to the store specifying information being transmitted. The owned-card specifying information acquisition unit 13A acquires owned-card specifying information from the owned-card specifying information storage unit 211. The reward-related information acquisition unit 14A acquires reward-related information, using two or more pieces of reward information included in the two or more pieces of card information received by the card information receiving unit 28, and the owned-card specifying information acquired by the owned-card specifying information acquisition unit 13A. The reward-related information output unit 15A transmits the reward-related information acquired by the reward-related information acquisition unit 14A to the card device 3A.

The reward-related information receiving unit 32A included in the card device 3A receives reward-related information from the terminal device 2A. Constituent elements other than the above-described elements perform the same operations as those described in the first embodiment.

Figure 8:
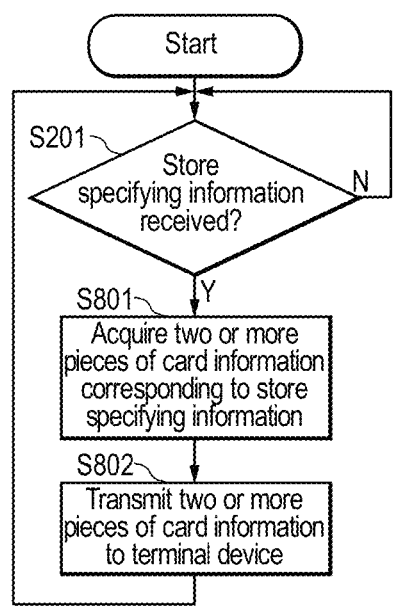
FIG. 8 shows a flowchart for operations of a server device 1A according to the same.

Next, operations of the information system 300A will be described with reference to the flowcharts shown in FIGS. 8 to 10. FIG. 8 is a flowchart for operations of the server device 1A. This flowchart includes steps S201, S801, and S802. The processing performed in step S201 is described in the first embodiment. If it is determined in step S201 that store specifying information has been received, processing proceeds to step S801, and if not, processing returns to step S201.

Step S801: The card information acquisition unit 16 acquires, from the store information storage unit 111, two or more pieces of card information corresponding to the store specifying information received by the store specifying information accepting unit 12.

Step S802: The card information transmitting unit 17 transmits the two or more pieces of card information acquired by the card information acquisition unit 16 to the terminal device 2A. Thereafter, processing returns to step S201.

Note that the processing shown in FIG. 8 is performed on one terminal device 2A, and if there are two or more terminal devices 2A, the same processing is performed on each of the other terminal devices 2A. That is, the server device 1A may perform two or more sequences of the same processing as in FIG. 2 in parallel or through time division.

Figure 9:
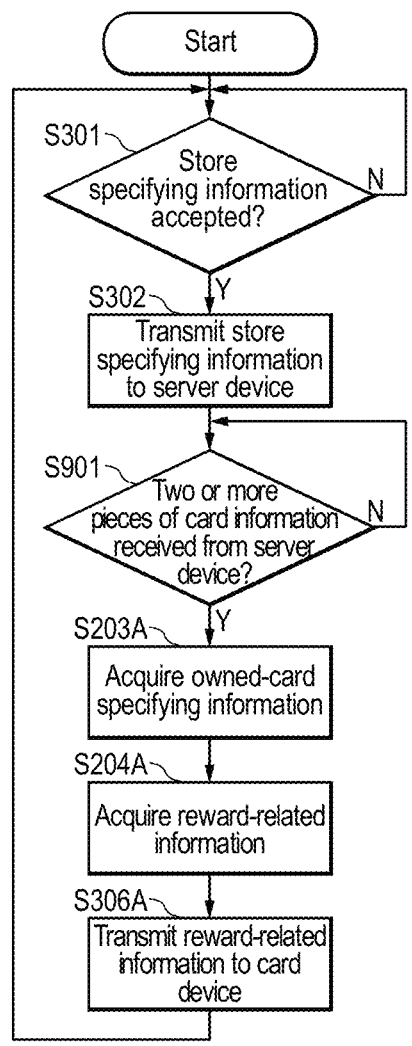
FIG. 9 shows a flowchart for operations of a terminal device 2A according to the same.

FIG. 9 is a flowchart for operations of the terminal device 2A. This flowchart includes steps S301, S302, S901, S203A, S204A, and S306A. The processing performed in steps S301 and S302 is described in the first embodiment.

Step S901: The card information receiving unit 28 determines whether or not it has received two or more pieces of card information from the server device 1A. If the card information receiving unit 28 determines that it has received two or more pieces of card information from the server device 1A, processing proceeds to step S203A, and if not, processing returns to step S901.

Step S203A: The owned-card specifying information acquisition unit 13A acquires owned-card specifying information from the owned-card specifying information storage unit 211.

Step S204A: The reward-related information acquisition unit 14A acquires reward-related information, using two or more pieces of reward information included in the two or more pieces of card information received by the card information receiving unit 28, and the owned-card specifying information acquired by the owned-card specifying information acquisition unit 13A.

Step S306A: The reward-related information output unit 15A transmits the reward-related information acquired by the reward-related information acquisition unit 14A to the card device 3A. Thereafter, processing returns to step S301.

Figure 10:
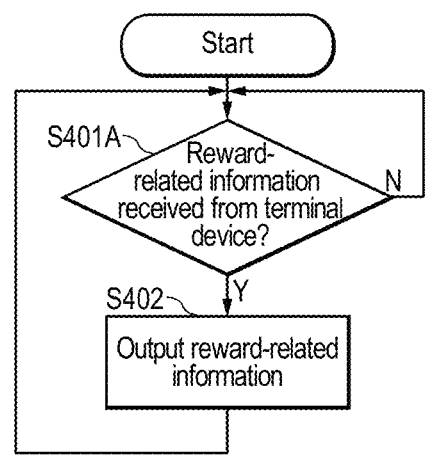
FIG. 10 shows a flowchart for operations of a card device 3A according to the same.

FIG. 10 is a flowchart for operations of the card device 3A. This flowchart includes steps S401A and S402. The processing performed in step S402 is described in the first embodiment.

Step S401A: The reward-related information receiving unit 32A determines whether or not it has received reward-related information from the terminal device 2A. If the reward-related information receiving unit 32A determines that it has received reward-related information from the terminal device 2A, processing proceeds to step S402, and if not, processing returns to step S401A.

Operations of the information system 300A according to the present embodiment are different from operations of the information system 300 according to the first embodiment only in the roles of the three devices, namely, the server, terminal, and card devices, and specific descriptions thereof will be omitted.

As described above, according to the present embodiment, with the information system 300A that includes: a store information storage unit 111 in which one or more pieces of store information are stored, each piece of store information including a store identifier that identifies a store, and two or more pieces of card information each including a card identifier that identifies a card that is available at a store and reward information regarding a reward that is to be gained when a card is used; a store specifying information accepting unit 12 that accepts store specifying information that specifies a store at which a card is used when an item or a service is purchased; a reward-related information acquisition unit 14A that uses two or more pieces of reward information included in card information regarding two or more cards corresponding to two or more pieces of card information included in store information regarding a store specified by the store specifying information, out of two or more cards specified by owned-card specifying information that is stored information that specifies two or more cards owned by a user who purchases an item or a service, to acquire reward-related information related to reward information regarding two or more cards that the user can use at the store; and a reward-related information output unit 15A that outputs reward-related information acquired by the reward-related information acquisition unit 14A, the user is assisted to use a card with which the user can receive a reward that is beneficial for the user, and thus the user can easily select a card with which the user can receive a beneficial reward, from among multiple cards that are available at the store and are owned by the user.

Also, in the above-described information system 300A, the reward-related information acquisition unit 14A uses reward information regarding two or more cards that the user can use at the store, to acquire reward-related information that specifies a card corresponding to reward information that indicates the highest reward, based on a predetermined method. As a result, the user can easily select a card with which the user can receive the most beneficial reward. That is, the user can select a card such that the user can receive the highest reward at each store.

Also, in the above-described information system 300A, the reward-related information acquisition unit 14A acquires the ranks of two or more pieces of reward information based on a predetermined method, using reward information regarding two or more cards that the user can use at the store, to acquire reward-related information that specifies the ranks. As a result, the user can select a card that is to be used, using reward-related information that specifies the ranks of the two or more pieces of reward information and considering the ranks of the rewards as well.

Also, the above-described information system 300A includes a server device 1A, a terminal device 2A, and a card device 3A, the server device 1A including: the store information storage unit 111; the store specifying information accepting unit 12 that receives the store specifying information from the terminal device 2A; a card information acquisition unit 16 that acquires, from the store information storage unit 111, two or more pieces of card information corresponding to the store specifying information received by the store specifying information accepting unit 12; and a card information transmitting unit 17 that transmits the two or more pieces of card information acquired by the card information acquisition unit 16 to the terminal device 2A, the terminal device 2A including: an owned-card specifying information storage unit 211 in which the owned-card specifying information that specifies two or more cards owned by a user is stored; a second store specifying information accepting unit 22 that accepts the store specifying information; a store specifying information transmitting unit 23 that transmits the store specifying information accepted by the second store specifying information accepting unit 22 to the server device 1A; a card information receiving unit 28 that receives the two or more pieces of card information from the server device 1A in response to the store specifying information being transmitted; an owned-card specifying information acquisition unit 13A that acquires the owned-card specifying information from the owned-card specifying information storage unit 211; the reward-related information acquisition unit 14A that uses two or more pieces of reward information included in the two or more pieces of card information received by the card information receiving unit 28, and the owned-card specifying information, to acquire reward-related information related to reward information regarding two or more cards that the user can use at the store; and the reward-related information output unit 15A that transmits the reward-related information acquired by the reward-related information acquisition unit 14A to the card device 3A, and the card device 3A including: a reward-related information receiving unit 32A that receives the reward-related information from the terminal device 2A; and a second reward-related information output unit 33 that outputs the reward-related information received by the reward-related information receiving unit 32A. Thus, it is possible to realize an information system 300A that includes the server device 1A, the terminal device 2A, and the card device 3A, and in which mainly the terminal device 2A assists the user to use a card with which the user can receive a beneficial reward.

Also, the terminal device 2A includes: an owned-card specifying information storage unit 211 in which owned-card specifying information that specifies two or more cards owned by a user is stored; a second store specifying information accepting unit 22 that accepts the store specifying information; a store specifying information transmitting unit 23 that transmits the store specifying information to the server device 1A; a card information receiving unit 28 that receives the two or more pieces of card information from the server device 1A in response to the store specifying information being transmitted; a reward-related information acquisition unit 14A that uses the owned-card specifying information stored in the owned-card specifying information storage unit 211 and two or more pieces of reward information included in the two or more pieces of card information received by the card information receiving unit 28, to acquire reward-related information related to reward information regarding two or more cards that the user can use at the store; and a reward-related information output unit 15A that outputs the reward-related information acquired by the reward-related information acquisition unit 14A, and the terminal device 2A cooperates with the server device 1A. Thus, it is possible to realize a terminal device 2A that assists the user to use a card with which the user can receive a beneficial reward.

Software that realizes the information system 300A according to the present embodiment is a program that causes a computer to function as the above-described units, and is, for example, the following program. That is, a store information storage unit 111 is stored in a recording medium that can be accessed by a computer, and in the store information storage unit 111, one or more pieces of store information are stored. Each piece of store information includes: a store identifier that identifies a store; and two or more pieces of card information each including a card identifier that identifies a card that is available at a store and reward information regarding a reward that is to be gained when a card is used. The program causes the computer to function as: a store specifying information accepting unit 12 that accepts store specifying information that specifies a store at which a card is used when an item or a service is purchased; an owned-card specifying information acquisition unit 13A that acquires owned-card specifying information that specifies two or more cards owned by a user who purchases an item or a service; a reward-related information acquisition unit 14A that uses two or more pieces of reward information included in card information regarding two or more cards corresponding to two or more pieces of card information included in store information regarding a store specified by the store specifying information, out of two or more cards specified by owned-card specifying information that specifies two or more cards owned by a user who purchases an item or a service, to acquire reward-related information related to reward information regarding two or more cards that the user can use at the store; and a reward-related information output unit 15A that outputs reward-related information acquired by the reward-related information acquisition unit 14A.

Note that, in the present embodiment, the server device 1A manages store information, and the server device 1A receives store specifying information that specifies a store from the terminal device 2A, acquires card information regarding two more cards that are available at the store, and transmits the card information thus acquired to the terminal device 2A, whereas the terminal device 2A manages owned-card specifying information, and the terminal device 2A acquires store specifying information that specifies a store and transmits the store specifying information to the server device 1A, receives card information from the server device 1A, acquires reward-related information that uses reward information corresponding to the two or more cards specified by the owned-card specifying information out of cards that are available at the store, and transmits the reward-related information to the terminal device 2A, and the card device 3A receives the reward-related information from the terminal device 2A, and outputs the reward-related information. However, for example, it is possible to realize an embodiment in which the terminal device 2A is excluded from the information system 300A, by distributing the functions of the terminal device 2A to the server device 1A and the card device 3.

Third Embodiment

Figure 11:
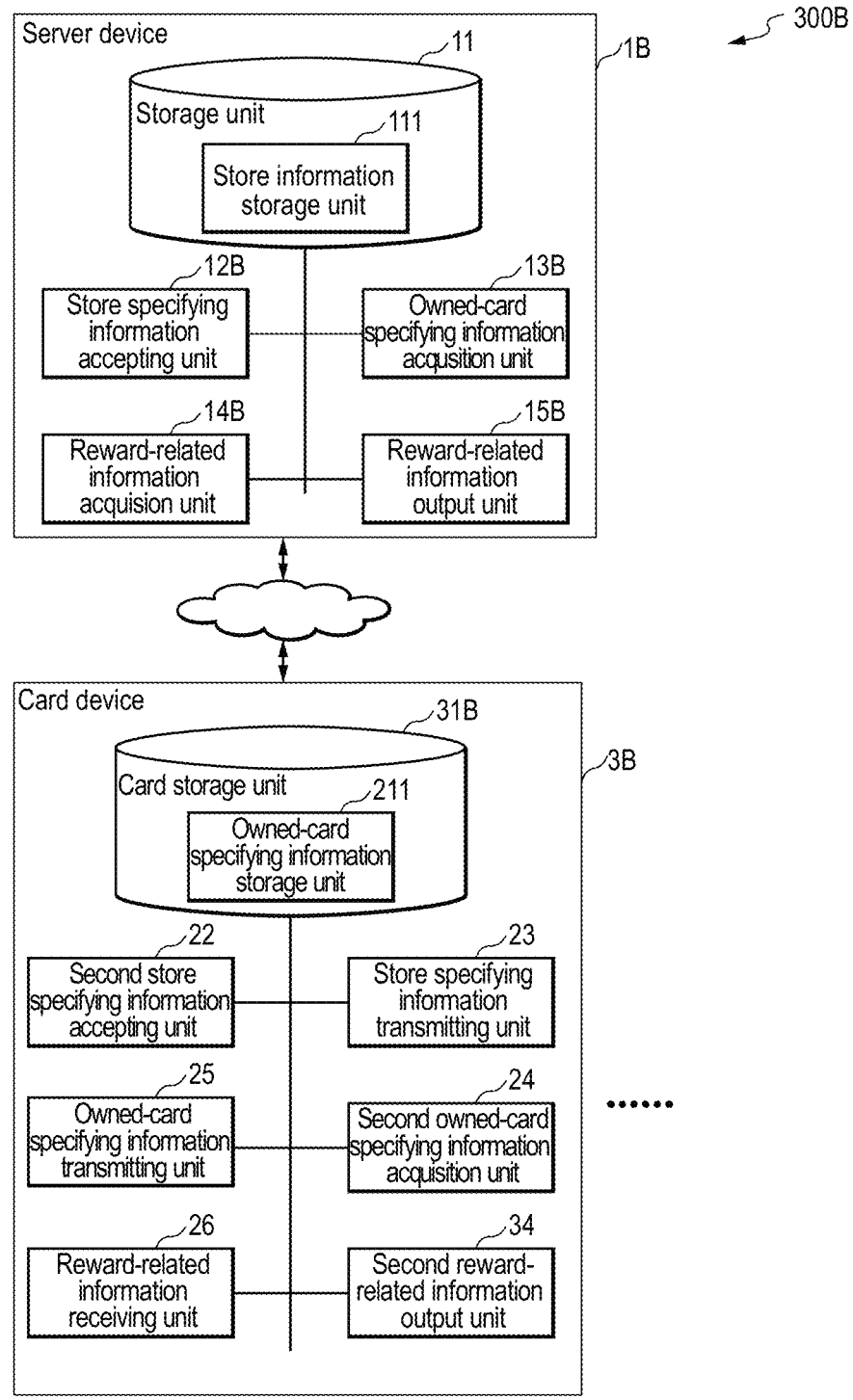
FIG. 11 is a block diagram for an information system according to a third embodiment.

FIG. 11 is a block diagram for the information system 300B according to the present embodiment. The information system 300B includes a server device 1B and one or more card devices 3B. Note that constituent elements and steps indicated by reference numerals with an appendix "B" are different from those in the first and second embodiments in their internal configurations and some operations, and descriptions of the features that they have in common will be omitted or simplified. The server device 1B and the card device 3B are connected via a network or the like, for example, so as to be able to communicate with each other. The card device 3B includes a communication module for performing communication via a network, for example.

The server device 1B includes a storage unit 11, a store specifying information accepting unit 12B, a card information acquisition unit 16, a card information transmitting unit 17B, an owned-card specifying information acquisition unit 13B, a reward-related information acquisition unit 14B, and a reward-related information output unit 15B. The card device 3B includes a card storage unit 31B, a second store specifying information accepting unit 22, a store specifying information transmitting unit 23, a card information receiving unit 28, a second owned-card specifying information acquisition unit 24, a reward-related information receiving unit 26, a second reward-related information output unit 33, and an owned-card specifying information transmitting unit 25. The card storage unit 31B includes an owned-card specifying information storage unit 211.

The store specifying information accepting unit 12B included in the server device 1B receives store specifying information from the card device 3B. The owned-card specifying information acquisition unit 13B receives owned-card specifying information from the card device 3B. The card information transmitting unit 17B transmits two or more pieces of card information acquired by the card information acquisition unit 16 to the card device 3B. The reward-related information acquisition unit 14B uses two or more pieces of reward information included in card information regarding two or more cards corresponding to two or more pieces of card information included in store information regarding a store specified by the store specifying information received by the store specifying information accepting unit 12, out of two or more cards specified by the owned-card specifying information received by the owned-card specifying information acquisition unit 13B, to acquire reward-related information related to reward information regarding two or more cards that the user can use at the store, from the store information storage unit 111. The reward-related information output unit 15B transmits the reward-related information acquired by the reward-related information acquisition unit 14B to the card device 3B.

The card storage unit 31B included in the card device 3B may store various kinds of information. Various kinds of information are, for example, identification information that identifies the card device 3B, identification information that identifies the server device 1B, and so on. Constituent elements other than the above-described elements perform the same operations as those described in the first and second embodiments.

Figure 12:
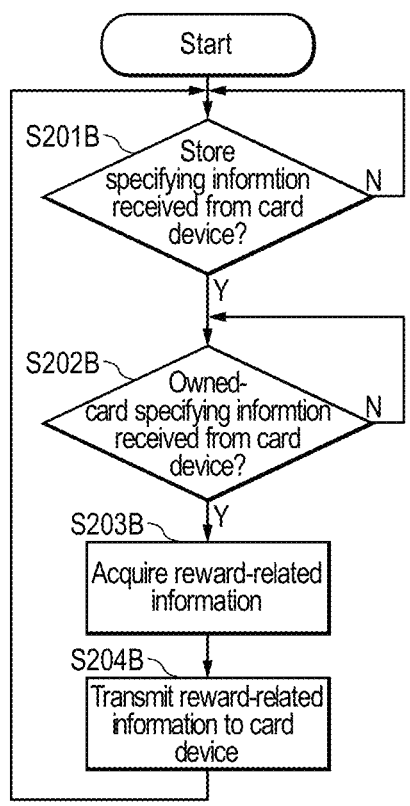
FIG. 12 shows a flowchart for operations of a server device 1B according to the same.

Next, operations of the information system 300B will be described with reference to the flowcharts shown in FIGS. 12 and 13. FIG. 12 is a flowchart for operations of the server device 1B. This flowchart includes steps S201B, S801, S802B, S202B, S203B, and S204B. The processing performed in step S801 is described in the second embodiment.

Step S201B: The store specifying information accepting unit 12B determines whether or not it has received store specifying information from the card device 3. If the store specifying information accepting unit 12B determines that it has received store specifying information from the card device 3, processing proceeds to step S801, and if not, processing returns to step S201B.

Step S802B: The card information transmitting unit 17B transmits two or more pieces of card information acquired by the card information acquisition unit 16 to the card device 3B.

Step S202B: The owned-card specifying information acquisition unit 13B determines whether or not it has received owned-card specifying information from the card device 3B. If the owned-card specifying information acquisition unit 13B determines that it has received owned-card specifying information from the card device 3B, processing proceeds to step S203B, and if not, processing returns to step S02B.

Step S203B: The reward-related information acquisition unit 14B uses two or more pieces of reward information included in card information regarding two or more cards corresponding to two or more pieces of card information included in store information regarding a store specified by the store specifying information received by the store specifying information accepting unit 12B, out of two or more cards specified by the owned-card specifying information received by the owned-card specifying information acquisition unit 13B, to acquire reward-related information related to reward information regarding two or more cards that the user can use at the store, from the store information storage unit 111.

Step S204B: The reward-related information output unit 15B transmits the reward-related information acquired by the reward-related information acquisition unit 14B to the card device 3B. Thereafter, processing returns to step S210B.

Note that the processing shown in FIG. 12 is performed on one card device 3B, and if there are two or more card devices 3B, the same processing is performed on each of the other card devices 3B. That is, the server device 1 may perform two or more sequences of the same processing as in FIG. 12 in parallel or through time division.

Figure 13:
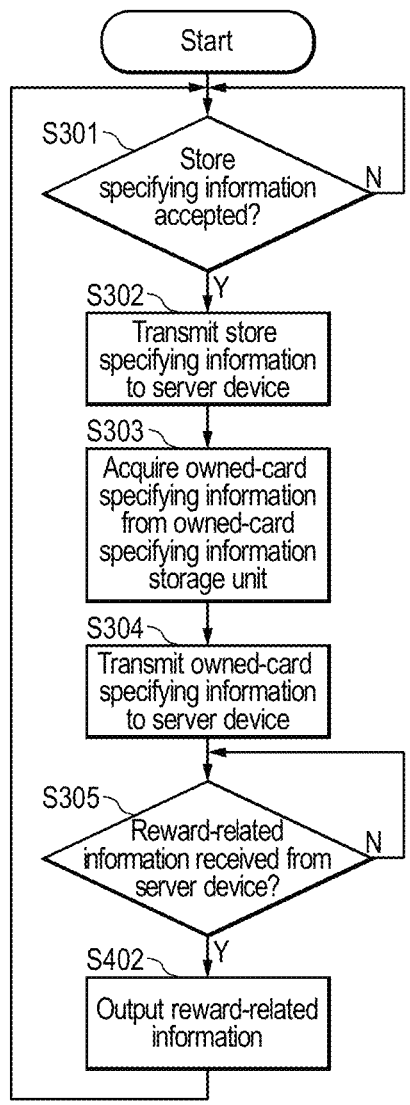
FIG. 13 shows a flowchart for operations of a card device 3B according to the same.

FIG. 13 is a flowchart for operations of the card device 3B. This flowchart includes steps S301, S302, S901, S203, S304, S305, and S402. The processing performed in each step is described in the first and second embodiments.

Operations of the information system 300B according to the present embodiment are different from operations of the information system 300 and 300A according to the first and second embodiments only in the roles of the devices, and specific descriptions thereof will be omitted.

As described above, according to the present embodiment, with the information system 300B that includes: a store information storage unit 111 in which one or more pieces of store information are stored, each piece of store information including a store identifier that identifies a store, and two or more pieces of card information each including a card identifier that identifies a card that is available at a store and reward information regarding a reward that is to be gained when a card is used; a store specifying information accepting unit 12B that accepts store specifying information that specifies a store at which a card is used when an item or a service is purchased; a reward-related information acquisition unit 14B that uses two or more pieces of reward information included in card information regarding two or more cards corresponding to two or more pieces of card information included in store information regarding a store specified by the store specifying information, out of two or more cards specified by owned-card specifying information that is stored information that specifies two or more cards owned by a user who purchases an item or a service, to acquire reward-related information related to reward information regarding two or more cards that the user can use at the store; and a reward-related information output unit 15B that outputs reward-related information acquired by the reward-related information acquisition unit 14B, the user is assisted to use a card with which the user can receive a reward that is beneficial for the user, and thus the user can easily select a card with which the user can receive a beneficial reward, out of multiple cards that are available at the store and are owned by the user.

Also, in the above-described information system 300B, the reward-related information acquisition unit 14B uses reward information regarding two or more cards that the user can use at the store, to acquire reward-related information that specifies a card corresponding to reward information that indicates the highest reward, based on a predetermined method. As a result, the user can easily select a card with which the user can receive the most beneficial reward. That is, the user can select a card such that the user can receive the highest reward at each store.

Also, in the above-described information system 300B, the reward-related information acquisition unit 14B acquires the ranks of two or more pieces of reward information based on a predetermined method, using reward information regarding two or more cards that the user can use at the store, to acquire reward-related information that specifies the ranks. As a result, the user can select a card that is to be used, using reward-related information that specifies the ranks of the two or more pieces of reward information and considering the ranks of the rewards as well.

Also, the above-described information system 300B includes a server device 1B and a card device 3B, the server device 1B including: the store information storage unit 111; the store specifying information accepting unit 12B that receives store specifying information from the card device 3B; a card information acquisition unit 16 that acquires, from the store information storage unit 111, two or more pieces of card information corresponding to the store specifying information received by the store specifying information accepting unit 12B; a card information transmitting unit 17B that transmits the two or more pieces of card information acquired by the card information acquisition unit 16 to the card device 3B; an owned-card specifying information acquisition unit 13B that receives, from the card device 3B, owned-card specifying information that specifies two or more cards owned by a user who purchases an item or a service; the reward-related information acquisition unit 14B that uses two or more pieces of reward information included in card information regarding two or more cards corresponding to two or more pieces of card information included in store information regarding a store specified by the store specifying information received by the store specifying information accepting unit 12B, out of two or more cards specified by the owned-card specifying information received by the owned-card specifying information acquisition unit 13B, to acquire reward-related information related to reward information regarding two or more cards that the user can use at the store; and the reward-related information output unit 15B that transmits the reward-related information acquired by the reward-related information acquisition unit 14B to the card device 3B, and the card device 3B including: an owned-card specifying information storage unit 211 in which the owned-card specifying information that specifies two or more cards owned by a user is stored; a second store specifying information accepting unit 22 that accepts the store specifying information; a store specifying information transmitting unit 23 that transmits the store specifying information to the server device 1B; a card information receiving unit 28 that receives the two or more pieces of card information from the server device 1B in response to the store specifying information being transmitted; a second owned-card specifying information acquisition unit 24 that acquires owned-card specifying information from the owned-card specifying information storage unit 211; an owned-card specifying information transmitting unit 25 that transmits the owned-card specifying information acquired by the second owned-card specifying information acquisition unit 24 to the server device 1B; a reward-related information receiving unit 26 that receives the reward-related information; and a second reward-related information output unit 33 that outputs the reward-related information received by the reward-related information receiving unit 26. Thus, it is possible to realize an information system 300B that includes the server device 1B and the card device 3B, and in which mainly the server device 1B assists the user to use a card with which the user can receive a beneficial reward.

Also, the card device 3B includes: an owned-card specifying information storage unit 211 in which owned-card specifying information that specifies two or more cards owned by a user is stored; a reward-related information receiving unit 26 that receives reward-related information; and a second reward-related information output unit 33 that outputs one or more pieces of reward-related information received by the reward-related information receiving unit, and the card device 3B cooperates with the server device 1B. Thus, it is possible to realize a card device 3B that assists the user to use a card with which the user can receive a beneficial reward.

Software that realizes the information system 300B according to the present embodiment is a program that causes a computer to function as the above-described units, and is, for example, the following program. That is, a store information storage unit 111 is stored in a recording medium that can be accessed by a computer, and one or more pieces of store information are stored in the store information storage unit 111. Each piece of store information includes: a store identifier that identifies a store; and two or more pieces of card information each including a card identifier that identifies a card that is available at a store and reward information regarding a reward that is to be gained when a card is used. The program causes the computer to function as: a store specifying information accepting unit 12B that accepts store specifying information that specifies a store at which a card is used when an item or a service is purchased; an owned-card specifying information acquisition unit 13B that acquires owned-card specifying information that specifies two or more cards owned by a user who purchases an item or a service; a reward-related information acquisition unit 14B that uses two or more pieces of reward information included in card information regarding two or more cards corresponding to two or more pieces of card information included in store information regarding a store specified by the store specifying information, out of two or more cards specified by owned-card specifying information that specifies two or more cards owned by a user who purchases an item or a service, to acquire reward-related information related to reward information regarding two or more cards that the user can use at the store; and a reward-related information output unit 15B that outputs reward-related information acquired by the reward-related information acquisition unit 14B.

Note that, in the present embodiment, the server device 1B manages store information, and the server device 1B receives store specifying information that specifies a store from the terminal device 2, acquires card information regarding two more cards that are available at the store, transmits the card information thus acquired to the terminal device 2, receives owned-card specifying information from the terminal device 2, acquires reward-related information that uses reward information corresponding to the two or more cards specified by the owned-card specifying information, and outputs the reward-related information to the card device 3B, whereas the card device 3B manages owned-card specifying information, and the card device 3B acquires store specifying information that specifies a store and transmits the store specifying information to the server device 1B, receives card information from the server device 1B, acquires owned-card specifying information and transmits the owned-card specifying information to the server device 1B, receives reward-related information from the server device 1B, and outputs the reward-related information. However, for example, it is possible to realize an embodiment in which the card device 3B is excluded from the information system 300B, by realizing the functions of the card device 3B using a terminal device 2B (not shown).

Figure 14:
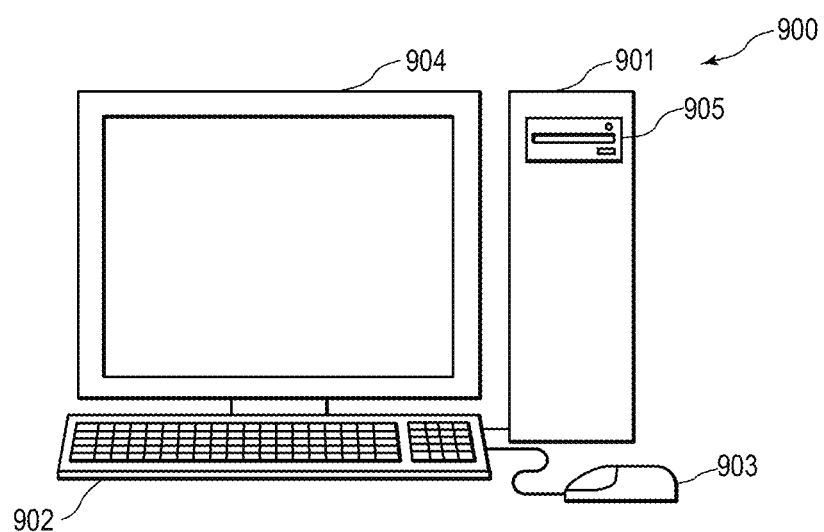
FIG. 14 shows an external appearance of a computer system that realizes the information systems according to the embodiments.

FIG. 14 shows an example of an external appearance of a computer system 900 that realizes the information system 300, 300A, or 300B by executing a program described in the embodiments. Each embodiment can be realized by computer hardware and a computer program executed thereon. In FIG. 14, the computer system 900 includes a computer 901 that includes a CD-ROM drive 905, a keyboard 902, a mouse 903, and a display 904. Note that the overall system including the keyboard 902, the mouse 903, and the display 904 may be referred to as a computer.

Figure 15:
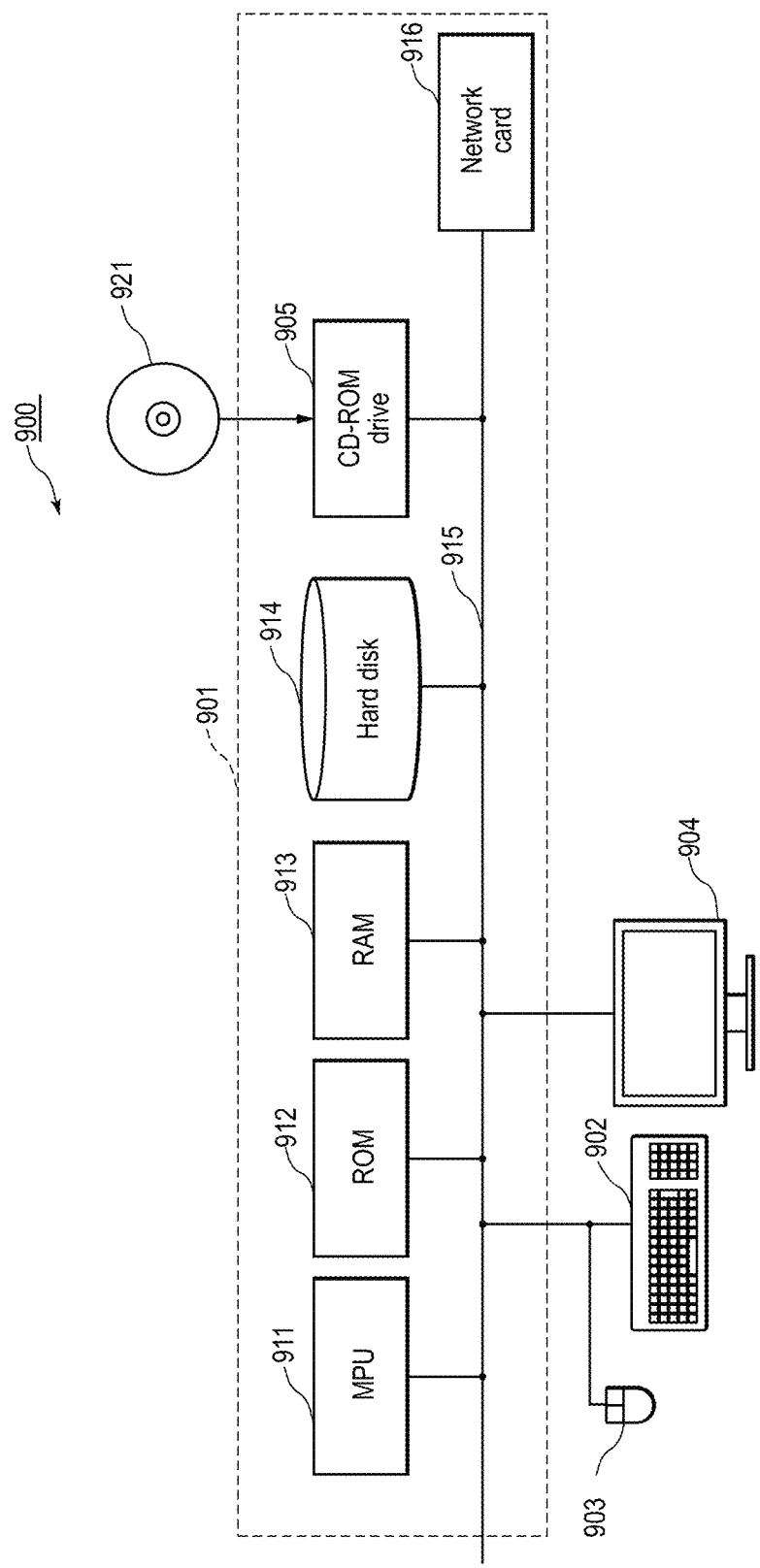
FIG. 15 shows an internal configuration of the computer system according to the same.

FIG. 15 shows an internal configuration of the computer system 900. In FIG. 15, the computer 901 includes, in addition to the CD-ROM drive 905: an MPU 911; a ROM 912 for storing programs such as a boot-up program; a RAM 913 that is connected to the MPU 911, temporarily stores instructions for application programs, and provides a temporal storage space; a hard disk 914 in which application programs, system programs and data are stored; a bus 915 that connects the MPU 911, the ROM 912, and so on to each other; and a network card 916 for providing connection to a network such as the Internet.

Programs that cause the computer system 900 to execute the functions of the information system 300 and so on may be stored in the CD-ROM 921, and transferred to the hard disk 914 upon the CD-ROM 921 being inserted into the CD-ROM drive 905. Alternatively, the programs may be transmitted to the computer 901 via a network such as the Internet, and stored in the hard disk 914. The programs are loaded to the RAM 913 when they are to be executed. Note that the programs may be loaded from the CD-ROM 921 or directly from the network. Also, instead of the CD-ROM 921, the programs may be read into the computer system 900 via another detachable recording medium (e.g. a DVD or a memory card).

The programs do not necessarily include an operating system (OS), third party programs, or the like that cause the computer 901, which shows details, to execute the functions of the information system 300 and so on. The programs may include only some instructions that call appropriate functions and modules in a mode under control so that desirable results can be obtained. How the computer system 900 operates is well known, and therefore detailed descriptions will be omitted.

Note that the above-described programs do not involve processing that is performed by hardware in a transmission step of transmitting information, a receiving step of receiving information, and so on, e.g. processing that is performed by a network card or the like (processing that is performed only by hardware) in the transmission step.

Also, the above-described programs may be executed by a single computer or multiple computers. That is, centralized processing or distributed processing may be performed.

Also, needless to say, two or more communication means included in one device (e.g. the reward-related information receiving unit 26, the reward-related information transmitting unit 27, and so on included in the terminal device 2) may be physically realized as a single medium.

Also, in the above-described embodiments, each kind of processing (each function) may be realized by a single device (system) that performs centralized processing, or realized by multiple devices that perform distributed processing.

Modification

Note that the following configurations, for example, may be added to the above-described embodiments so that settlement is performed using a card corresponding to one piece of reward-related information out of the one or more pieces of reward-related information output by the reward-related information output unit (15, 15A, 15B).

The card storage unit (31, 31, 31B) of the card device (3, 3A, 3B) may be able to store credit card information regarding each of two or more cards owned by the user. Credit card information includes information that is necessary for card settlement, such as a credit card number, an expiration date, and a user identification information that identifies the user of the card.

The process through which the two or more pieces of credit card information are stored in the card storage unit of the card device is not limited. For example, credit card information regarding a card may be provided from a server of a card company that issues the card via a network or a communication network, or a recording medium such as a memory card, and stored in the card storage unit.

Specifically, if a server (hereinafter also referred to as a "credit card information processing device") of each card company that issues a card may include, for example: a credit card information storage unit in which one or more pieces of credit card information are stored; and a credit card information transmitting unit that transmits each of the one or more pieces of credit card information stored in the credit card information storage unit. The card device may further include, for example: a credit card information receiving unit that receives credit card information from the credit card information processing device; an accumulation unit that accumulates credit card information received by the credit card information receiving unit into the card storage unit; and a credit card information output unit that outputs credit card information stored in the card storage unit.

Preferably, the card device may further include: a card selection accepting unit that accepts selection of one card from among two or more cards; a credit card information acquisition unit that acquires credit card information regarding the selected card from the card storage unit; and a credit card information output unit that outputs the acquired credit card information. Outputting is usually transmission to an external device (such as a terminal in a store or a settlement server of a card company), but may be accumulation into a recording medium. The destination of output and how output is performed are not limited.

According to this modification, the user uses the card device to select a card with which the user can receive a beneficial reward, from among two or more cards, and settlement can be performed using the card. Therefore, the user need not to carry two or more cards with him/her. On the other hand, card companies store credit card information in the card device, and need not to issue a card.

Specifically, the above-described two or more cards may be physical card or virtual cards. A physical card is a card that is physical, and is a card that has a credit card function. A virtual card is a card that is virtual, and is a card that has a credit card function. A virtual card may be created instead of issuing a physical card, or created based on the premise that a physical card will be issued. The credit card function is the function that a credit card has. Note that details of a physical card, a virtual card, and the credit card function will be described in a fourth embodiment below.

The information system may include: a credit card information storage unit in which credit card information that includes at least a credit card number of such a card is stored; a card selection accepting unit that accepts selection of one card from among two or more cards, in response to reward-related information being output by the reward-related information output unit; and a credit card information output unit that outputs at least a credit card number included in credit card information that is stored in the credit card information storage unit and that constitutes a pair with the one card, in response to the selection being accepted.

Also, in the above-described modification, the credit card information processing device may further include: a credit card number changing unit that, when a predetermined condition is satisfied, changes a credit card number included in each of one or more pieces of credit card information stored in the credit card information storage unit. The predetermined condition is, for example, a timing condition that is a condition regarding timing, or a usage mode condition that is a condition regarding how the credit card function is used. However, any condition may be employed. Changing the credit card number if the timing condition is satisfied is, for example, changing it at each predetermined timing. Specifically, the credit card information processing device may further include a timing information storage unit in which timing information that indicates predetermined timing (e.g. an interval or a date) is stored, and the credit card number changing unit may change a credit card number at each predetermined timing indicated by timing information. Note that timing information will be described in the fourth embodiment. As a result, security is improved when settlement is performed using a card.

Changing the credit card number if a usage mode condition is satisfied is, for example, changing it at a frequency corresponding to a usage mode in which the credit card function is used. Specifically, the credit card information processing device may further include a usage mode information acquisition unit that acquires usage mode information that indicates a usage mode (e.g. a usage frequency, a usage count, a usage amount, and a usage location) in which the credit card function of the card is used, and the credit card number changing unit may change a credit card number at a frequency corresponding to the usage mode indicated by the usage mode information. Note that usage mode information will be described in the fourth embodiment. As a result, the credit card number of the card is updated at a frequency corresponding to the usage mode in which the credit card function of the card is used. Therefore, it is possible to improve security while reducing processing load.

Three embodiments for realizing the present invention are described above. However, in an information system that includes three devices, namely a server device, a terminal device, and a card device, for example, the card device may play the leading role, and the roles of the three devices are interchangeable. Also, in an information system that includes two devices, namely a server device and a card device, the card device may play the leading role. Also, in an information system that includes two devices, namely a server device and a terminal device, the terminal device or the server device may play the leading role, and thus the roles of the two devices are interchangeable. Also, the present invention may be realized using one device, and the number of devices that are included in the information system is not limited. The same applies to the above-described modification and the fourth and fifth embodiments described below.

Figure 16:
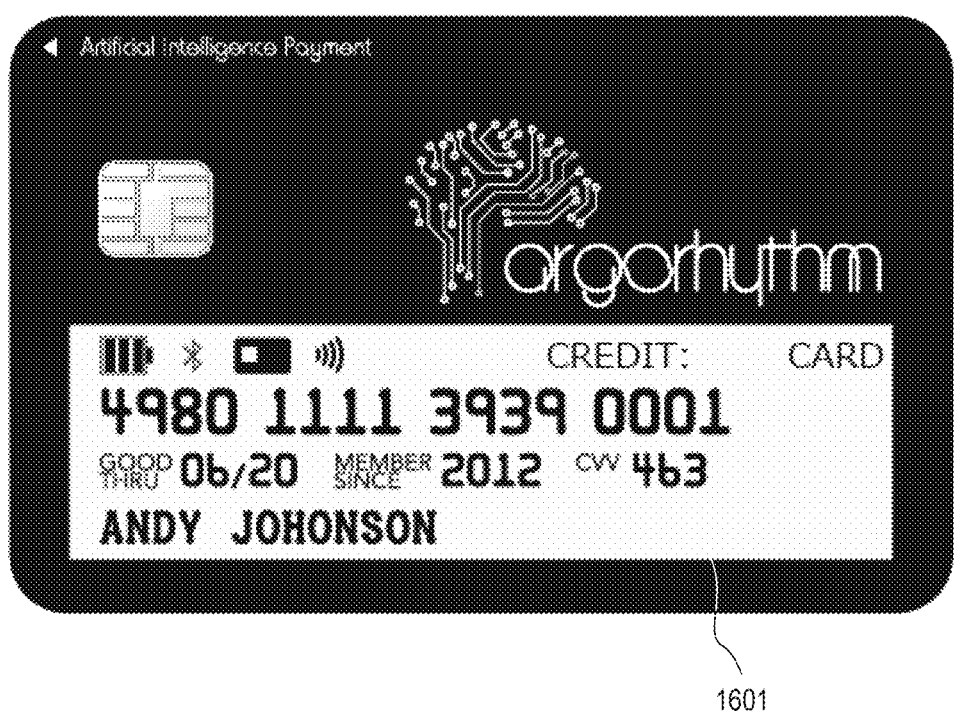
FIG. 16 shows an example of the shape of a card device according to the same.

Also, needless to say, the shape of the card device is not limited. The card device may be that shown in FIG. 16. In FIG. 16, 1601 indicates a screen with a touch panel, for example.

Fourth Embodiment

The present embodiment describes an information system that changes a credit card number of a card when a condition is satisfied.

Figure 17:
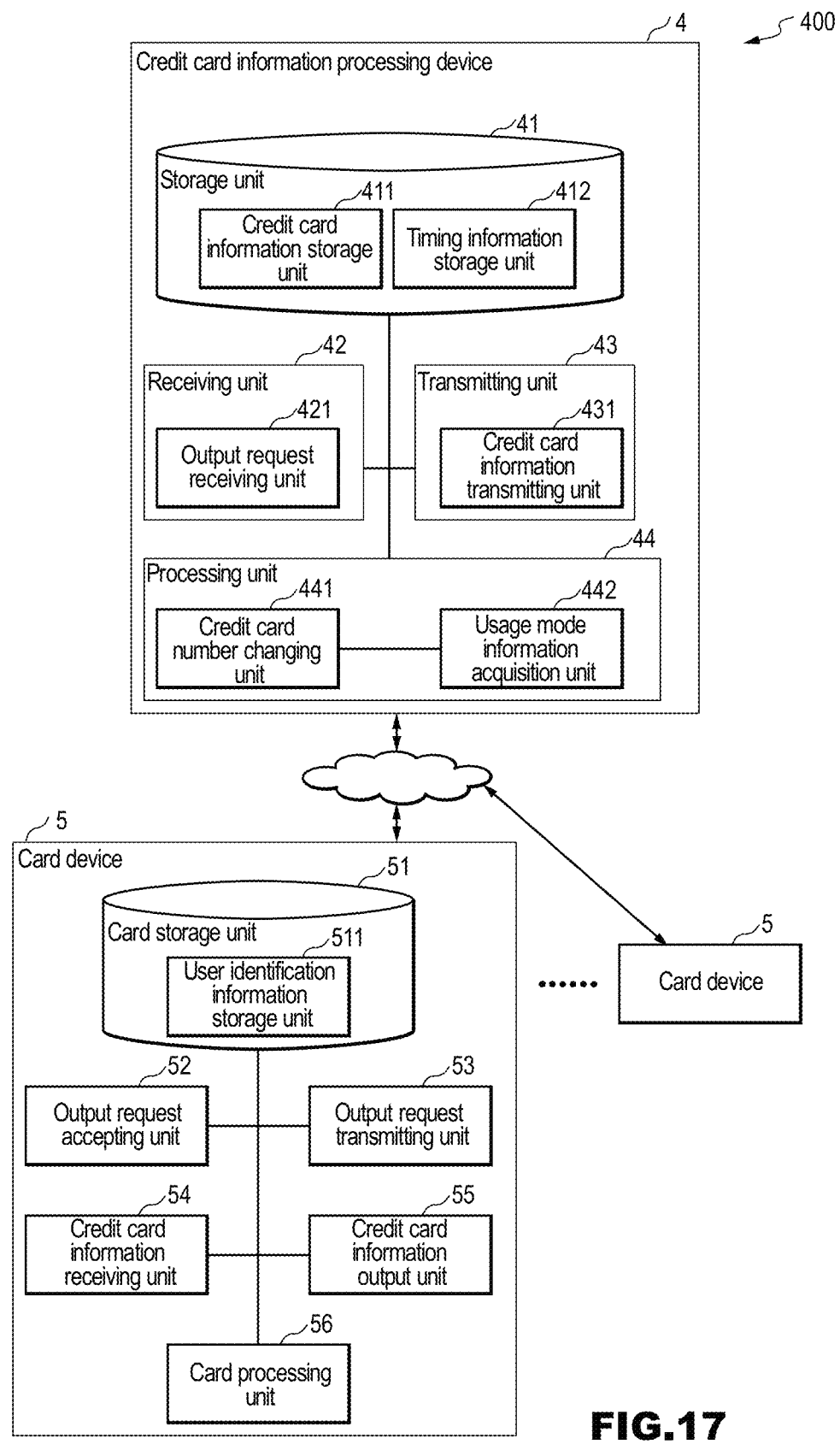
FIG. 17 is a block diagram for an information system 400 according to a fourth embodiment.

FIG. 17 is a block diagram for an information system 400 according to the present embodiment. The information system 400 includes a credit card information processing device 4 and a card device 5. The credit card information processing device 4 and the card device 5 are connected via a network such as a wireless LAN or the Internet, or a wireless or tethered communication network, for example, so as to be able to communicate with each other. Note that the credit card information processing device 4 and the card device 5 may be connected in any manner.

The credit card information processing device 4 is realized using, for example, a general-purpose server, a cloud server, or the like, but may be of any type. The card device 5 is realized using, for example, an IC card. The IC card includes, for example, an IC chip that includes a CPU, a memory, and so on, a communication module for performing network communication, a display, a touch panel, and so on. Note that the card device 5 may be of any type and have any configuration.

The credit card information processing device 4 includes a storage unit 41, a receiving unit 42, a transmitting unit 43, and a processing unit 44. The storage unit 41 includes a credit card information storage unit 411 and a timing information storage unit 412. The receiving unit 42 includes an output request receiving unit 421. The transmitting unit 43 includes a credit card information transmitting unit 431. The processing unit 44 includes a credit card number changing unit 441 and a usage mode information acquisition unit 442.

The card device 5 includes a card storage unit 51, an output request accepting unit 52, an output request transmitting unit 53, a credit card information receiving unit 54, a credit card information output unit 55, and a card processing unit 56. The card storage unit 51 includes a user identification information storage unit 511.

The storage unit 41 included in the credit card information processing device 4 may store various kinds of information. Various kinds of information are, for example, credit card information and timing information described below, and so on. The storage unit 41 may store conditions described below, such as a timing condition and a usage mode condition.

The credit card information storage unit 411 stores one or more pieces of credit card information that each include at least a credit card number of a card, and each constitute a pair with user identification information that identifies the user of a card.

Cards may be physical cards or virtual cards. A physical card is a card that is physical, and is a card that has a credit card function. A physical card is typically a plastic card that includes one or more selected from a magnetic member and an IC chip, in which credit card information is written. A credit card number, an expiration date, a user name, and so on are inscribed on the surface of the card. However, the configuration and the material of the card are not limited. Preferably, a physical card may further include, instead of an inscription, a display that displays at least credit card number included in credit card information stored in a magnetic member or the like.

A virtual card is a card that is virtual, and is a card that has a credit card function. A virtual card may be a virtual card of a first type that is created instead of issuing a physical card, or a virtual card of a second type that is created based on the premise that a physical card will be issued. The entity of virtual cards of both types is typically credit card information. Credit card information regarding a virtual card is typically stored in the storage unit of the server device 1. However, it may be stored in a storage unit of a cloud server (not shown), or the card storage unit 51 of the card device 5, and the location in which credit card information is stored is not limited.

A card is, for example, a credit card, a membership card having a credit card function, a point card having a credit card function, or the like, but any card may be employed. Credit card information may also include, for example, information regarding an expiration date, a credit limit, and so on. What information is included in the credit card information in addition to the credit card number is not limited.

The credit card function is the function that a credit card has. A credit card function is typically a settlement function with which cashless settlement can be performed and with which settlement can be performed later. However, a cash advance function and other additional service functions may also be included. Cashless settlement includes, for example, withdrawal and transfer using a bank account, settlement by check, and so on, but may be any kind of settlement that is performed without using cash. A cash advance function is a function with which the user can receive a loan in cash. Other service functions include, for example, a function with which the user can receive discount or preferential treatment, a function with which the user can exchange points that have been saved up according to the amount of settlement with a reward such as a gift, and so on. Note that any kinds of credit card functions may be employed.

User identification information includes, for example, one or more pieces of information selected from among a name, an address, a telephone number, and a mail address. Also, user identification information in the present embodiment also includes a card device identifier that identifies the card device 5 owned by the user. The card device identifier is, for example, a MAC address or an IP address, but may be of any kind. Note that user identification information may be any information as long as it can identify the user of the card.

The timing information storage unit 412 stores timing information. Timing information is information that indicates predetermined time. Note that timing information will be described below. The timing information storage unit 412 may store pairs each consisting of user identification information and timing information.

The receiving unit 42 receives various kinds of information. Various kinds of information include, for example, an output request, which will be described below.

The output request receiving unit 421 receives an output request from the card device 5. Note that the output request will be described below. The output request receiving unit 421 typically receives an output request in a pair with user identification information. Note that, if the credit card information storage unit 411 stores only one piece of user identification information, the piece of user identification information may be omitted. Also, receiving a pair is a concept including that an output request includes user identification information.

The transmitting unit 43 transmits various kinds of information. Various kinds of information are, for example, credit card information described below, and so on.

The credit card information transmitting unit 431 transmits credit card information stored in the credit card information storage unit 411, in response to an output request being received. The credit card information transmitting unit 431 typically transmits, to the card device 5 identified by the card device identifier included in the user identification information received in a pair with an output request, credit card information that is stored in the credit card information storage unit 411 and constitutes a pair with the user identification information. The card information transmitting unit 431 typically transmits all of the pieces of information included in the credit card information that constitutes a pair with the user identification information. However, the card information transmitting unit 431 may transmit only the credit card number, or some pieces of information including the credit card number.

The processing unit 44 performs various kinds of processing. Various kinds of processing include, for example, processing that is performed to change a credit card number as described below, processing that is performed to acquire the usage mode information, and so on. The processing unit 44 may also perform, for example, processing to change timing indicated by timing information stored in the timing information storage unit 412, according to usage mode information acquired by the usage mode information acquisition unit 442 described below. The processing unit 44 also performs various kinds of determination, such as determination as to whether or not an output request has been received, and determination as to whether or not it is time to change a credit card number.

The credit card number changing unit 441 changes a credit card number included in credit card information stored in the credit card information storage unit 411 when a predetermined condition is satisfied. The predetermined condition is, for example, a timing condition that is a condition related to time or a usage mode condition that is a condition regarding how the credit card function is used, but may be any condition. The timing condition may be, for example, a condition that a change is made on a predetermined date, a condition that a change is made at each predetermined timing, or the like, and any condition related to timing may be employed.

Usage condition may be, for example, a condition that a change is made if one or more selected from a usage frequency, a usage count and usage amount is no less than a threshold value, a greater than a threshold value, no greater than a threshold value, or less than a threshold value, or a condition that a change is made if a usage location is a specific condition. The usage location may be, for example, information that indicates the location of the store at which the user used the credit card function, information indication the location of the user, or information that indicates a store type or a difference in scale, such as a virtual store, an actual store, a large-scale store, a small-scale store. The specific place may be any place such as an oversea location, a domestic location, a specific country or area, or the like. Thus, the usage mode condition may be any condition as long as it is related to a usage mode of the credit card function.

Making a change if a timing condition is satisfied may be, for example, making a change on a date determined by the timing condition or making a change at each timing determined by the timing condition. A change made at each timing is, in other words, a periodical change. Timing is, for example, at least one of an interval or a date. An interval is, for example, one minute, one day, one week, and so on. The length of the interval is not limited. A date may be a day and time, a day of the week and time, or only time. A day may be in a year-month-day format, a month-day format, or a day-only format. Timing may be expressed using an interval and a date, e.g. at zero second each minute, at zero o'clock each day, at zero o'clock on each Sunday, or the like, and may be expressed in any format. The predetermined timing may be fixed timing or timing that is determined so as to be changeable. The above-described timing information is information that indicates such timing.

The credit card number changing unit 441 may change a credit card number in response to the current time acquired from, for example, an internal clock of the MPU or an NTP server satisfying the timing condition stored in the storage unit 41. Alternatively, the credit card number changing unit 441 may change a credit card number at each timing indicated by timing information stored in the timing information storage unit 412, for example.

Making a change if the usage mode condition is satisfied is, for example, making a change in response to a usage mode of the credit card function satisfying the usage mode condition, or making a change at a frequency corresponding to the usage mode of the credit card function.

The credit card number changing unit 441 may change a credit card number in response to the usage mode indicated by the usage mode information acquired by the usage mode information acquisition unit 442 satisfying the usage mode condition stored in the storage unit 41, for example. Alternatively, the credit card number changing unit 441 may change a credit card number at a frequency corresponding to the usage mode indicated by the usage mode information acquired by the usage mode information acquisition unit 442. If the usage mode information acquisition unit 442 acquires usage mode information for each of the credit card functions (e.g. the settlement function and the cash advance function function), the credit card number changing unit 441 may change a credit card number at a different frequency for each type of credit card function (for example, even if the amount of money is the same, when the cash advance function is used, the credit card number may be changed at a higher or lower frequency than when the settlement function is used). Although details will be described below, the usage mode may be, for example, a usage frequency, a usage count, a usage amount, or a usage location (e.g. the ratio between an oversea location, a domestic location, an actual store and a virtual store).

Alternatively, when the usage mode information acquisition unit 442 acquires usage mode information, the processing unit 44 may change timing indicated by timing information stored in the timing information storage unit 412 according to the usage mode information acquired by the usage mode information acquisition unit 442, whereas the credit card number changing unit 441 may change a credit card number at each period of time indicated by the timing information stored in the information storage unit 412.

If this is the case, for example, the storage unit 41 stores pairs each consisting of usage mode information and timing information. Timing information indicates, for example, once per minute, once per day, once per week, once per month, or at zero second each minute, at zero o'clock each day, at zero o'clock on each Sunday, or at zero o'clock on the first data of each month, and so on, and may be expressed in any format. For example, if usage mode information is usage frequency information, the storage unit 41 may store a pair consisting of usage frequency information "one or more times per day" and timing information "once per minute", a pair consisting of usage frequency information "one or more times per week" and timing information "once per day", a pair consisting of usage frequency information "one or more times per month" and timing information "once per week", and so on. If usage mode information is usage count information, the storage unit 41 may store a pair consisting of usage count information "zero times" and timing information "zero o'clock each month", a pair consisting of usage count information "no less than once and no greater than ten times" and timing information "zero o'clock each day", a pair consisting of usage count information "eleven times or more" and change frequency information "at zero second each minute", and so on. If usage mode information is usage mount information, the storage unit 41 may store a pair consisting of usage amount information "an average settlement amount per usage is no greater than three thousand yen" and timing information "once per week", a pair consisting of usage amount information "a settlement amount per month is no less than fifty thousand yen" and timing information "once per day", a pair consisting of usage amount information "a cumulative settlement amount in this year is no less than one million yen" and timing information "once per minute", and so on. For example, if usage mode information is usage location information, the storage unit 41 may store a pair consisting of usage location information "oversea locations are no less than 50%" and change frequency information "zero second each minute", a pair consisting of usage location information "actual stores are 80% or more" and change frequency information "at zero o'clock each day", and so on.

The processing unit 44 acquires, from the storage unit 41, change frequency information corresponding to usage mode information acquired by the usage mode information acquisition unit 442, and updates the timing information stored in the timing information storage unit 412 with the acquired timing information. For example, if the stored timing information is "once per week" and usage frequency information "one or more times per day" is acquired, the processing unit 44 acquires timing information "once per minute" corresponding to the usage frequency information "one or more times per day" from the storage unit 41, and updates the stored timing information "once per week" with the acquired timing information "once per minute". As a result, the frequency at which the credit card number changing unit 441 changes the credit card number is changed from "once per week" to "once per minute". Similarly, if usage count information "eleven times or more" is acquired, the frequency at which the credit card information is to be changed is changed to "at zero second each minute" corresponding to the usage count information. Similarly, if usage amount information "an average settlement amount per usage is no greater than three thousand yen" is acquired, the change frequency is changed to "once per week" corresponding to the usage amount information. Similarly, if usage location information "oversea locations are no less than 50%" is acquired, the credit card number changing unit 441 changes change frequency information to "once per minute" corresponding to the usage location information.

Alternatively, the credit card number changing unit 441 may determine the frequency by using usage mode information acquired by the usage mode information acquisition unit 442 and a predetermined function. For example, if usage mode information is usage frequency information, the function may be an increasing function that indicates a higher change frequency for a higher usage frequency. Also, for example, if usage mode information is usage count information, the function may be an increasing function that indicates a higher change frequency for a greater usage count. Also, for example, if usage mode information is usage amount information, the function may be an increasing function that indicates a higher change frequency for a greater usage amount. However, any function or algorithm may be used to determine the frequency.

If the card is a virtual card of the first type, the credit card number changing unit 441 changes the credit card number of the virtual card. If the card is a virtual card of the second type, and the physical card that constitutes a pair with this card has a display, the credit card number changing unit 441 change a credit card number that is shared between these cards. However, if the card is a virtual card of the second type, and the physical card that constitutes a pair with this card has an inscription on it such as a credit card number and does not have a display, it is difficult to change the credit card number of the physical card. Therefore, the credit card number changing unit 441 typically changes the credit card number of only the virtual card. As a result, the credit card number of the virtual card will be different from the credit number of the physical card.

The usage mode information acquisition unit 442 acquires usage mode information. Usage mode information is information that indicates a usage mode. A usage mode is a mode in which a credit card function of a card is used. The usage mode is, for example, the above-described usage frequency, usage count, usage amount, usage location, and so on, but may be of any kind. The usage mode information acquisition unit 442 acquires, for example, from a settlement server (not shown) that performs settlement using a card, usage frequency information that indicates a usage frequency, usage count information that indicates a usage count, usage amount information that indicates a usage amount, usage location information that indicates a usage location, and so on. The usage mode information acquisition unit 442 may acquire such usage mode information for each type of credit card function, such as a settlement function, a cash advance function, and so on. However, the type of usage mode information and the source from which usage mode information is acquired are not limited.

The card storage unit 51 included in the card device 5 may store various kinds of information. Various kinds of information include, for example, user identification information.

The user identification information storage unit 511 stores one piece of user identification information. One piece of user identification information is information that identifies a user who uses a credit card function of the card and who owns the card device 5. This user identification information includes, as described above, a card device identifier that identifies the card device 5 owned by the user. However, the card device identifier is not necessarily included in user identification information, and may be stored so as to constitute a pair with user identification information, for example.

The output request accepting unit 52 accepts an output request. An output request is an instruction that requests output of credit card information that constitutes a pair with one piece of user identification information. Receiving is a concept including receiving information input from an input device such as a touch panel or a microphone, receiving information transmitted via a tethered or a wireless communication network or network, receiving information read out from a recording medium such as an optical disc, a magnetic disk, or s semiconductor memory, and so on. Note that if an output request is accepted via a microphone, the output request accepting unit 52 needs to have an audio recognition function.

In the present embodiment, the card device 5 is for one specific user, and user identification information regarding the one user is stored in the user identification information storage unit 511. Therefore, the output request accepting unit 52 typically accepts only an output request. However, the output request accepting unit 52 may accept a pair consisting of one piece of user identification information regarding the user and an output request. If the card device 5 is shared among two or more users, the output request accepting unit 52 typically accepts a pair consisting of one piece of user identification information and an output request.

The output request transmitting unit 53 transmits the output request accepted by the output request accepting unit 52 to the credit card information processing device 4 in a pair with the one piece of user identification information.

In response to the output request transmitted by the output request transmitting unit 53, the credit card information receiving unit 54 receives the credit card information transmitted by the credit card information transmitting unit 431.

The credit card information output unit 55 outputs at least a credit card number included in the credit card information received by the credit card information receiving unit 54. That is, the credit card information output unit 55 may output all of the pieces of information included in the credit card information or only the credit card number. Outputting is a concept including displaying on a display, outputting audio from a speaker, printing using a printer, transmitting to an external device, storing on a recording medium, handing over the result of processing to another processing device or another program, and so on.

Therefore, as a result, in response to the output request being accepted by the output request accepting unit 52, the credit card information output unit 55 outputs at least the credit card number included in the credit card information that is stored in the credit card information storage unit 411 and that constitutes a pair with one piece of user identification information stored in the user identification information storage unit 511.

The card processing unit 56 performs various kinds of processing. Various kinds of processing include, for example, determination regarding whether or not an output request has been accepted, determination regarding whether or not credit card information has been received, and so on.

The storage unit 41, the credit card information storage unit 411, the timing information storage unit 412, the card storage unit 51, the user identification information storage unit 511, which are described above (and a terminal storage unit 61 described below) are preferably non-volatile recording media, but can be realized using volatile recording media. Also, a process through which various kinds of information are stored in the storage unit 41 and so on is not limited.

The processing unit 44, the credit card number changing unit 441, the usage mode information acquisition unit 442, and the card processing unit 56 (and a terminal processing unit 64 described below) are typically realized using an MPU, a memory, and so on. Processing procedures that are performed by the processing unit 44 and so on are typically realized using software, and the software is recorded on a recording medium. However, they may be realized using hardware (dedicated circuits).

The receiving unit 42, the output request receiving unit 421, and the credit card information receiving unit 54 may or may not include one or more pieces of hardware out of a communication module and a broadcast receiving module. The transmitting unit 43, the credit card information transmitting unit 431, and the output request transmitting unit 53 may or may not include one or more pieces of hardware out of a communication module and a broadcast module. The credit card information output unit 55 may or may not include an output device. An output request transfer unit 62 and a credit card transfer unit 63 described below may or may not include a communication module, a broadcast receiving module, and a broadcast module. The receiving function of the receiving unit 42 and so on, the transmitting function of the transmitting unit 43 and so on, the outputting function of the credit card information output unit 55, and the transferring function of the output request transfer unit 62 and so on can be realized using driver software for the one or more pieces of hardware, or using the one or more pieces of hardware and the driver software for them.

Next, operations of the information system 400 will be described with reference to the flowcharts shown in FIGS. 18 and 19.

Figure 18:
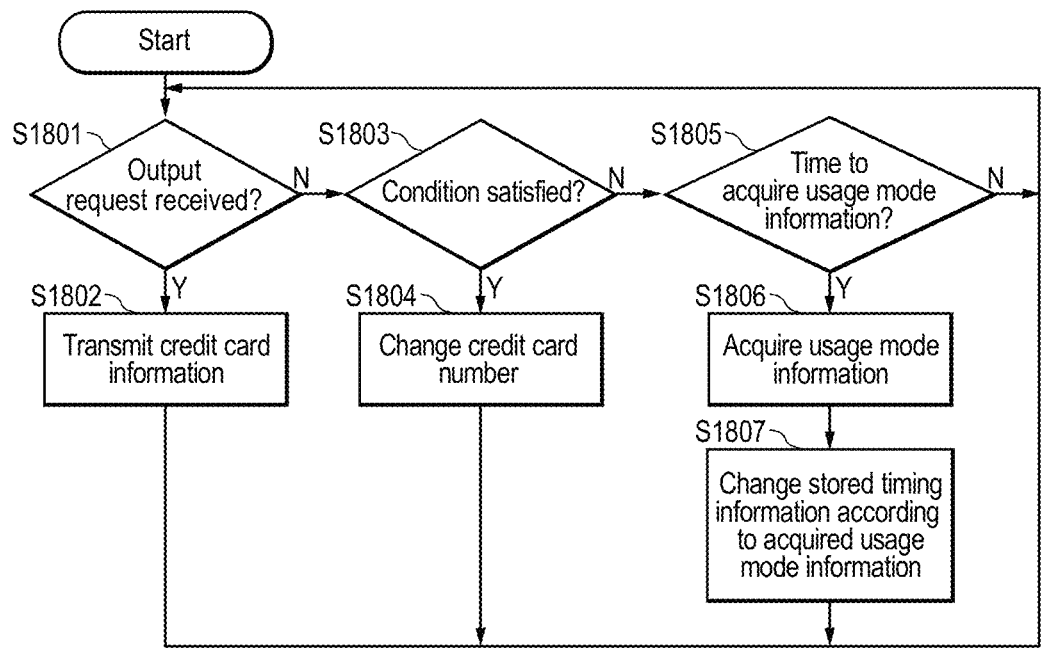
FIG. 18 is a flowchart illustrating operations of a credit card information processing device 4 according the fourth embodiment and a fifth embodiment.

FIG. 18 is a flowchart illustrating operations of the credit card information processing device 4.

Step S1801: The processing unit 44 determines whether or not an output request from the card device 5 has been received by the output request receiving unit 421. If the output request receiving unit 421 has received the output request, processing proceeds to step S1802, and if not, processing proceeds to step S1803.

Step S1802: The credit card information transmitting unit 431 transmits, to the card device 5 identified by the card device identifier included in the user identification information received in a pair with the above-described output request, credit card information that is stored in the credit card information storage unit 411 and constitutes a pair with the user identification information. Thereafter, processing returns to step S1801.

Step S1803: The processing unit 44 determines whether or not a predetermined condition is satisfied, using, for example, a timing condition and a usage mode condition stored in the storage unit 41, the current time acquired from an internal clock or the like, usage mode information acquired by the usage mode information acquisition unit 442, and so on. Then, if the predetermined condition is satisfied, processing proceeds to step S1804, and if the predetermined condition is not satisfied, processing proceeds to step S1805.

Specifically, the processing unit 44 may acquire the current time from an internal clock of the MPU, an NTP server, or the like, and determine whether or not it is time to change a credit card number, using the acquired current time and timing information stored in the timing information storage unit 412. If it is time to change the credit card number, processing proceeds to step S1804, and if it is not time to change the credit card number, processing proceeds to step S1805.

Step S1804: The credit card number changing unit 441 changes the credit card number of the credit card information that is stored in the credit card information storage unit 411 and that constitutes a pair with the user identification information. For example, two or more unused credit card numbers may be stored in the storage unit 41, and the credit card number changing unit 441 may select one from the credit card numbers as a new credit card number, and change the existing credit card number to the selected new credit card number. However, the credit card number changing unit 441 may use a random number to determine a new credit card number, and any algorithm may be employed to determine a new credit card number.

Step S1805: The processing unit 44 determines whether or not it is time to acquire usage mode information. For example, the storage unit 41 may store acquire time information that indicates time to acquire usage mode information, and the processing unit 44 may acquire the current time, and perform such determination using the acquired current time and the update time information stored in the storage unit 41. If it is time to acquire usage mode information, processing proceeds to step S1806, and if it is not time to acquire usage mode information, processing returns to step S1801.

Step S1806: The usage mode information acquisition unit 442 acquires, for example, from a settlement server that performs settlement using a card, various kinds of usage mode information such as usage frequency information that indicates a usage frequency, usage count information that indicates a usage count, usage amount information that indicates a usage amount, usage location information that indicates a usage location, and so on. However, the type of usage mode information and the source from which usage mode information is acquired are not limited.

Step S1807: The processing unit 44 changes timing information stored in the timing information storage unit 412 according to the usage mode information acquired by the usage mode information acquisition unit 442. Thereafter, processing returns to step S1801.

Note that the processing in shown in FIG. 18 starts in response to the credit card information processing device 4 being powered on or a program being started up, and ends in response to the credit card information processing device 4 being powered off or the program ending, for example. However, any trigger may be employed to start and stop processing.

Figure 19:
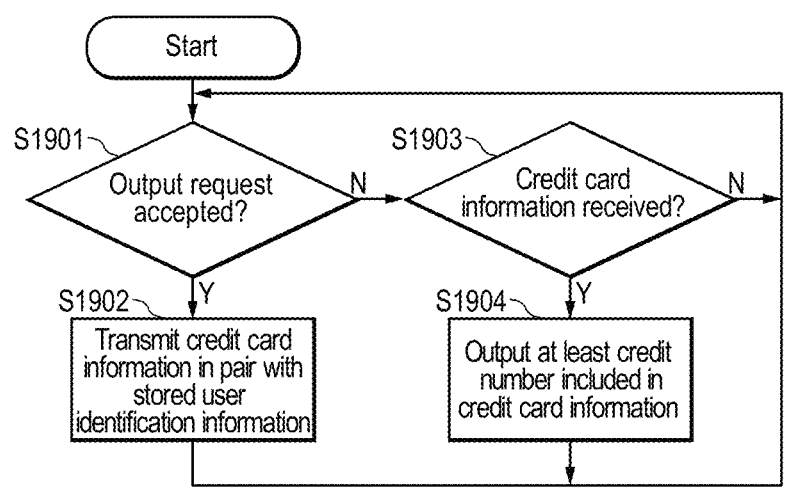
FIG. 19 is a flowchart illustrating operations of a card device 5 according to the same.

FIG. 19 is a flowchart illustrating operations of the card device 5.

Step S1901: The card processing unit 56 determines whether or not the output request accepting unit 52 has accepted an output request that requests output of credit card information. If the output request accepting unit 52 has received an output request, processing proceeds to step S1902, and if not, processing proceeds to step S1903.

Step S1902: The output request transmitting unit 53 transmits the output request accepted by the output request accepting unit 52 to the credit card information processing device 4 in a pair with the user identification information stored in the user identification information storage unit 511. Thereafter, processing returns to step S1901.

Step S1903: The card processing unit 56 determines whether or not the credit card information receiving unit 54 has received credit card information. If the credit card information receiving unit 54 has received credit card information, processing proceeds to step S1904, and if not, processing returns to step S1901.

Step S1904: The credit card information output unit 55 outputs at least a credit card number included in the credit card information received by the credit card information receiving unit 54. Thereafter, processing returns to step S1901.

Note that the processing shown in FIG. 19 starts in response to the card device 5 being powered on or a program being started up, and ends in response to the card device 5 being powered off or the program ending, for example. However, any trigger may be employed to start and stop processing.

The following describes specific examples of operations of the information system 400 according to the present embodiment. In this example, two or more users each have one or more cards and one card device 5. That is, the users and the cards correspond one-to-one or one-to-many, and the users and the card devices 5 correspond one-to-one.

The credit card information storage unit 411 included in the credit card information processing device 4 stores pairs each consisting of credit card information that includes the credit card numbers of the cards owned by a user, and user identification information that includes a card device identifier that identifies the card device 5 owned by the user. Pairs each consisting of credit card information and user identification information may be, for example, a pair consisting of a credit card number "4980 1111 3939 0001" and a card device identifier "12-34-56-78-90-ab", a pair consisting of a credit card information "1111 2222 3333 4444" and a card device identifier "24-35-46-57-68-79", and so on.

The timing information storage unit 412 stores pairs each consisting of user identification information and timing information. Pairs each consisting of a user identification information and timing information may be, for example, a pair consisting of a card device identifier "12-34-56-78-90-ab" and timing information "once per minute", a pair consisting of card device identifier "24-35-46-57-68-79" and timing information "once per week", and so on.

The storage unit 41 stores pairs each consisting of usage frequency information and timing information. Pairs each consisting of usage frequency information and timing information are, for example, a pair consisting of usage frequency information "one or more times per day" and timing information "once per minute", a pair consisting of usage frequency information "one or more times per week" and timing information "once per day", a pair consisting of usage frequency information "one or more times per month" and timing information "once per week", and so on. The storage unit 41 also stores update time information that indicates time to acquire usage mode information.

The user identification information storage unit 511 included in each of the two or more card devices 5 stores user identification information that identifies the user who owns the card device 5. This user identification information includes a card device identifier (e.g. a MAC address) that identifies the card device 5.

A user who wishes to use the credit card function of a card inputs an output request via an input device (e.g. a touch panel) of the card device 5. If the user owns two or more cards, the user may select one card on a touch panel or the like, and thereafter input an output request.

For example, in a card device 5 (hereinafter may also denoted as "the card device 5") in which the user identification information storage unit 511 stores a card device identifier "12-34-56-78-90-ab", upon the output request accepting unit 52 receiving an output request, the output request transmitting unit 53 transmits the output request to the credit card information processing device 4 in a pair with the card device identifier "12-34-56-78-90-ab".

In the credit card information processing device 4, upon the output request receiving unit 421 receiving the output request from the card device 5, the credit card information transmitting unit 431 transmits, to the card device 5 that is identified by the card device identifier "12-34-56-78-90-ab", credit card information that is stored in the credit card information storage unit 411 and that constitutes a pair with the card device identifier "12-34-56-78-90-ab".

In the card device 5, upon the credit card information receiving unit 54 receiving the credit card information, the credit card information output unit 55 outputs at least a credit card number "4980 1111 3939 0001" included in the credit card information, via an output device such as a display. The user can perform settlement using the credit card number thus output. Alternatively, the credit card information output unit 55 may output the credit card information received by the credit card information receiving unit 54 to a settlement server that performs settlement using a credit card, for example. If this is the case, the user can perform settlement without being particularly aware of the credit card number of the card.

In the credit card information processing device 4, the processing unit 44 determines whether or not it is time to change the credit card number, for each piece of user identification information. The processing unit 44 may acquire the current time from an internal clock of the MPU, for example, and perform such determination using the acquired current time and timing information for each piece of user identification information, stored in the timing information storage unit 412. For example, if it is time to change the credit card number corresponding to the card device identifier "12-34-56-78-90-ab", the credit card number changing unit 441 changes the credit card number "4980 1111 3939 0001" that is credit card information stored in the credit card information storage unit 411 and that constitutes a pair with the card device identifier "12-34-56-78-90-ab", to another number (e.g. "4980 1234 4837 0002"). The credit card number changing unit 441 may use, for example, a random number to determine a new credit card number that replaces the existing credit card number. If this is the case, the credit card number changing unit 441 may store used credit card numbers in the storage unit 41, determine whether or not the determined credit number is a used number, and if the determined number is a used number, determine a new credit card number using a random number.

In the credit card information processing device 4, the processing unit 44 also determines whether or not it is time to acquire usage mode information. The processing unit 44 may acquire the current time, and perform such determination using the acquired current time and the update time information stored in the storage unit 41. If it is time to acquire usage mode information, the usage mode information acquisition unit 442 acquires, for example, from a settlement server that performs settlement using a card, various kinds of usage mode information such as usage frequency information that indicates a usage frequency, usage count information that indicates a usage count, usage amount information that indicates a usage amount, usage location information that indicates a usage location, and so on. The processing unit 44 thus changes timing information stored in the timing information storage unit 412 according to the usage mode information acquired by the usage mode information acquisition unit 442. For example, if the stored timing information is "once per week" and usage frequency information "one or more times per day" is acquired, the processing unit 44 acquires timing information "once per day" corresponding to the usage frequency information "one or more times per day" from the storage unit 41, and updates the stored timing information "once per week" with the acquired timing information "once per day". As a result, the frequency at which the credit card number changing unit 441 changes the credit card number is changed from "once per week" to "once per minute".

As described above, according to the present embodiment, with an information system 400 that: stores one or more pieces of credit card information that each include at least a credit card number of a card that has a credit card function, such that each piece of credit card information constitutes a pair with user identification information that identifies the user of the card; accepts an output request that requests output of a piece of credit card information that constitutes a pair with one piece of user identification information; and outputs at least a credit card number included in the piece of credit card information that is stored and that constitutes a pair with the one piece of user identification information, in response to the output request being accepted, a credit card number included in the stored credit card information is changed when a predetermined condition is satisfied. Thus, it is possible to automatically change the credit card number. As a result, for example, security is improved when settlement is performed using a card.

Furthermore, the above-described information system 400 also stores timing information that indicates predetermined timing, and thus it is possible to change the credit card number at each timing indicated by the timing information.

Also, the above-described information system 400 acquires usage mode information that indicates a usage mode in which the credit card function of a card is used, and thus it is possible to change the credit card number at a frequency corresponding to the usage mode indicated by the usage mode information.

The above-described information system 400 includes the credit card information processing device 4 and the card device 5, the credit card information processing device 4 stores credit card information, and changes a credit card number when a predetermined condition is satisfied, receives an output request in a pair with user identification information, and transmits credit card information that is stored and that constitutes a pair with the user identification information, in response to the output request being received, and the card device 5 stores one piece of user identification information, accepts an output request, transmits the received output request in a pair with the one piece of user identification information, receives credit card information transmitted by the credit card information processing device 4 in response to the output request, and outputs at least a credit card number included in the received credit card information. With such a configuration, the credit card information processing device 4 can automatically change the credit card number output by the card device 5.

Note that software that realizes the credit card information processing device 4 according to the present embodiment is, for example, the following program. That is, a recording medium that can be accessed by a computer stores a credit card information storage unit 411 in which one or more pieces of credit card information are stored, each piece of credit card information including at least a credit card number of a card that has a credit card function and constituting a pair with user identification information that identifies a user of the card, and this program causes the computer to function as: the credit card number changing unit 441 that changes a credit card number included in credit card information stored in the credit card information storage unit 411 when a predetermined condition is satisfied; the output request receiving unit 421 that receives an output request in a pair with user identification information; and the credit card information transmitting unit 431 that transmits the credit card information that is stored in the credit card information storage unit 411 and that constitutes a pair with user identification information, in response to the output request being received.

Fifth Embodiment

The present embodiment also describes an information system that automatically changes a credit card number of a card. Note that the only difference from the information system 400 according to the fourth embodiment is that an information system 400A according to the present embodiment further includes a terminal device 6, and communication is performed between the credit card information processing device 4 and the card device 5 via the terminal device 6. Therefore, constituent elements and steps that are shared between them are assigned the same reference numerals, and descriptions of maters that have already been described will be omitted or simplified.

Figure 20:
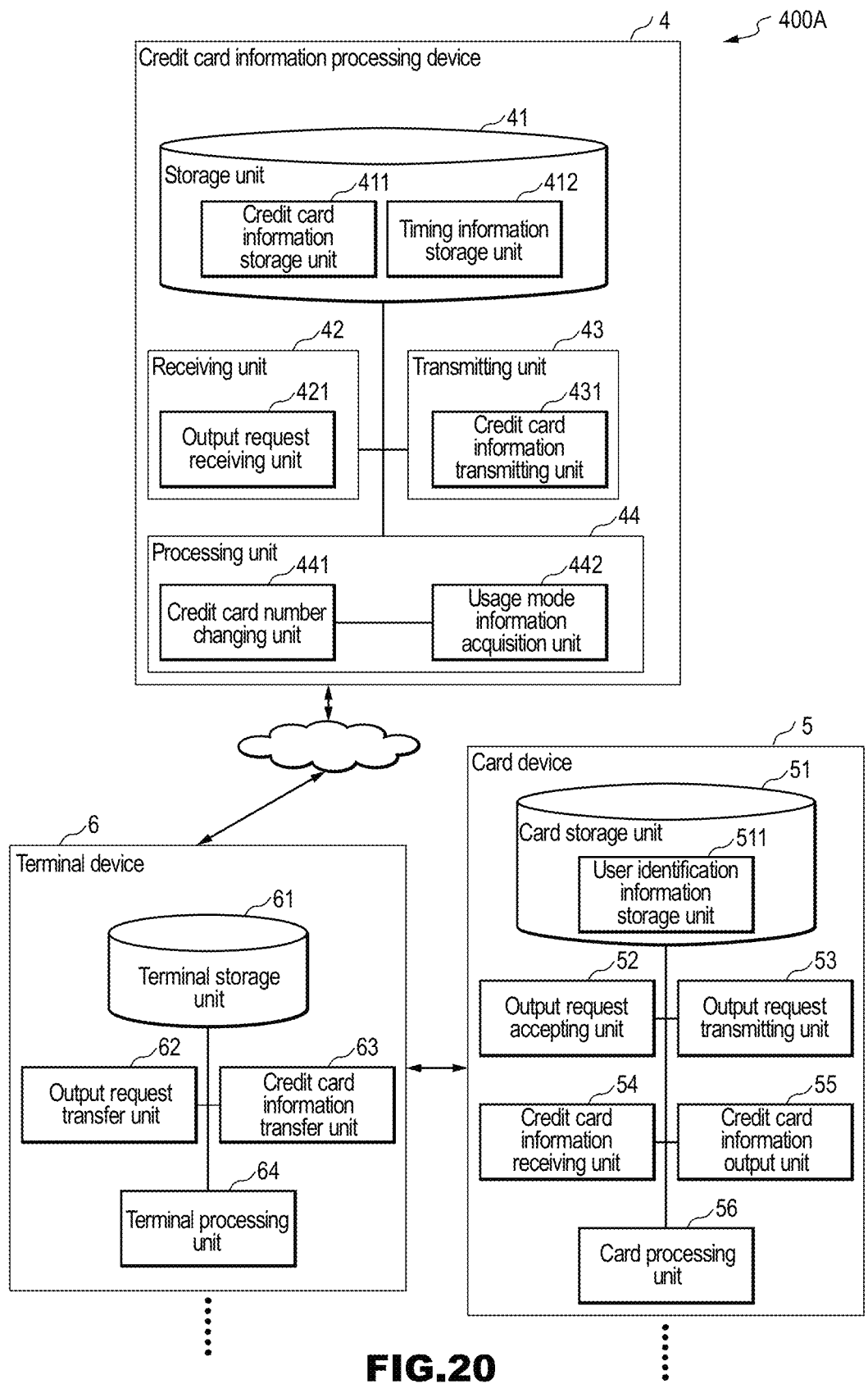
FIG. 20 is a block diagram for an information system 400A according to the fifth embodiment.

FIG. 20 is a block diagram for an information system 400A according to the present embodiment. The information system 400A includes a credit card information processing device 4, a card device 5, and a terminal device 6. The credit card information processing device 4 and the terminal device 6 are connected via a network such as a wireless LAN or the Internet, or a wireless or tethered communication network, for example, so as to be able to communicate with each other. The terminal device 6 and the card device 5 are connected via short-range wireless communication such as Bluetooth (registered trademark) or Zigbee (registered trademark), or tethered communication, so as to be able to communicate with each other. Note that the credit card information processing device 4 and the terminal device 6 may be connected in any manner. Also, the terminal device 6 and the card device 5 may be connected in any manner.

User identification information according to the present embodiment include terminal device identifier that identifies the terminal device 6 owned by the user, instead of, or in addition to, card device that identifies the card device 5 owned by the user. The terminal device identifier is, for example, a MAC address or an IP address, but may be of any kind.

The terminal device 6 includes a terminal storage unit 61, an output request transfer unit 62, a credit card information transfer unit 63, and a terminal processing unit 64.

The terminal storage unit 61 included in the terminal device 6 may store various kinds of information. Various kinds of information are, for example, a terminal identifier that identifies the terminal device 6, and so on. The output request transfer unit 62 receives an output request from the card device 5, and transmits it to the credit card information processing device 4. The credit card information transfer unit 63 receives credit card information from the credit card information processing device 4, and transmits it to the card device 5. The terminal processing unit 64 performs various kinds of processing. Various kinds of processing are, for example, processing that is performed to determine whether or not the output request transfer unit 62 has received an output request, processing that is performed to determine whether or not the credit card information transfer unit 63 has received credit card information, and so on.

Next, operations of the information system 400A will be described with reference to the flowchart shown in FIG. 21. Note that operations of the credit card information processing device 4 and the card device 5 are same as those shown in FIGS. 18 and 19 except that an output request and credit card information are transmitted and received via the card device 5.

Figure 21:
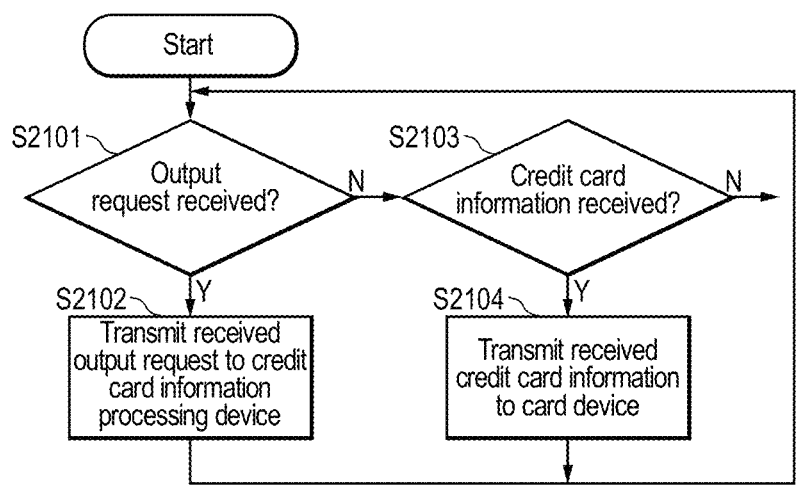
FIG. 21 is a flowchart illustrating operations of a terminal device 6 according to the same.

FIG. 21 is a flowchart illustrating operations of the terminal device 6.

Step S2101: The terminal processing unit 64 determines whether or not the output request transfer unit 62 has received an output request. If the output request transfer unit 62 has received an output request, processing proceeds to step S2102, and if not, processing proceeds to step S2103.

Step S2102: The output request transfer unit 62 transmits a pair consisting of the output request received by the output request transfer unit 62 and user identification information to the credit card information processing device 4. If the user identification information does not include a terminal identifier, the output request transfer unit 62 also transmits a terminal identifier stored in the terminal storage unit 61. Thereafter, processing returns to step S2101.

Step S2103: The terminal processing unit 64 determines whether or not the credit card information transfer unit 63 has received credit card information. If the credit card information transfer unit 63 has received credit card information, processing proceeds to step S2104, and if not, processing returns to step S2101.

Step S2104: The credit card information transfer unit 431 transmits the received credit card information to the card device 5. Thereafter, processing returns to step S2101.

Note that the processing according to the flowchart shown in FIG. 21 starts in response to the terminal device 6 being powered on or a program being started up, and ends in response to the terminal device 6 being powered off or the program ending, for example. However, any trigger may be employed to start and stop processing.

Specific examples of operations of the information system 400A according to the present embodiment are the same as those in the fourth embodiment except that transmission and reception is performed via the terminal device 6, and therefore descriptions thereof will be omitted.

As described above, according to the present embodiment, with an information system 400A that: stores one or more pieces of credit card information that each include at least a credit card number of a card that has a credit card function, such that each piece of credit card information constitutes a pair with user identification information that identifies the user of the card; accepts an output request that requests output of a piece of credit card information that constitutes a pair with one piece of user identification information; and outputs at least a credit card number included in the piece of credit card information that is stored and that constitutes a pair with the one piece of user identification information, in response to the output request being accepted, a credit card number included in the stored credit card information is changed when a predetermined condition is satisfied. Thus, it is possible to automatically change the credit card number. As a result, for example, security is improved when settlement is performed using a card.

Furthermore, timing information that indicates predetermined timing is also stored in the above-described information system 400A, and it is possible to change the credit card number at each timing indicated by the timing information.

Also, with the above-described information system 400A, usage mode information that indicates a usage mode in which the credit card function of a card is used is acquired, and thus it is possible to change the credit card number at a frequency corresponding to the usage mode indicated by the usage mode information.

The above-described information system 400A includes the credit card information processing device 4, the terminal device 6, and the card device 5, the credit card information processing device 4 stores credit card information, and changes a credit card number when a predetermined condition is satisfied, receives an output request in a pair with user identification information, transmits credit card information that is stored and that constitutes a pair with the user identification information, in response to the output request being received, the terminal device 6 receives an output request in a pair with user identification information, transmits it to the credit card information processing device 4, receives credit card information transmitted by the credit card information processing device 4, and transmits it to the card device, and the card device 5 stores one piece of user identification information, accepts an output request, transmits the received output request in a pair with the one piece of user identification information, receives credit card information transmitted by the credit card information processing device 4 in response to the output request, and outputs at least a credit card number included in the received credit card information. With such a configuration, the credit card information processing device 4 can automatically change the credit card number output by the card device 5, using the terminal device 6.

Note that software that realizes the credit card information processing device 4 according to the present embodiment may be, for example, the program described in the fourth embodiment.

Needless to say, the present invention is not limited to the above-described embodiments and may be variously modified, and such modifications are encompassed in the scope of the present invention.

INDUSTRIAL APPLICABILITY

As described above, the information systems and so on according to the present invention assist a user to use a card with which the user can receive a reward that is beneficial for the user. Thus, the information systems and so on are advantageous in that, for example, the user can select a card to be used at each store so that the user can receive the highest reward, and useful as information systems and so on.

REFERENCE NUMERALS

1, 1A, 1B: Server Device
2, 2A, 2B: Terminal Device
3, 3A, 3B: Card Device
11: Storage Unit
12, 12B: Store Specifying Information Accepting Unit
13, 13A, 13B: Owned-card Specifying Information Acquisition Unit
14, 14A, 14B: Reward-related Information Acquisition Unit
15, 15A, 15B: Reward-related Information Output Unit
16: Card Information Acquisition Unit
17: Card Information Transmitting Unit
21: Terminal Storage Unit
22: Second Store Specifying Information Accepting Unit
23: Store Specifying Information Transmitting Unit
24: Second Owned-card Specifying Information Acquisition Unit
25: Owned-card Specifying Information Transmitting Unit
26, 32A: Reward-related Information Receiving Unit
27: Reward-related Information Transmitting Unit
28: Card Information Receiving Unit
31, 31B: Card Storage Unit
32: Second Reward-related Information Receiving Unit
33: Second Reward-related Information Output Unit
111: Store Information Storage Unit
211: Owned-card Specifying Information Storage Unit
300, 300A, 300B: Information System
4: Credit Card Information Processing Device
5: Card Device
6: Terminal Device
41: Storage Unit
42: Receiving Unit
43: Transmitting Unit
44: Processing Unit
51: Card Storage Unit
52: Output Request Accepting Unit
53: Output Request Transmitting Unit
54: Credit Card Information Receiving Unit
55: Credit Card Information Output Unit
56: Card Processing Unit
61: Terminal Storage Unit
62: Output Request Transfer Unit
63: Credit Card Information Transfer Unit
64: Terminal Processing Unit
400, 400A: Information System
411: Credit Card Information Storage Unit
412: Timing Information Storage Unit
421: Output Request Receiving Unit
431: Credit Card Information Transmitting Unit 441: Credit Card Number Changing Unit
442: Usage Mode Information Acquisition Unit
511: User Identification Information Storage Unit

The invention claimed is:

1. An information system comprising:
a card device;
a server device; and
a terminal device coupled to the server device through a network, wherein:
the server device includes:
    a store information storage unit in which two or more pieces of store information are stored, each piece of store information including
    (1) a store identifier that identifies a store, and
    (2) two or more pieces of card information, each including
        (i) a card identifier that identifies a card that is available at the store, and
        (ii) reward information regarding a reward that is gained when the card is used at the store;
    and the server device is configured to perform
    accepting, using a store specifying information accepting unit, from the terminal device, store specifying information that specifies a store in which a card is used to purchase an item or a service offered by the store;
    receiving, using an owned-card specifying information acquisition unit, owned-card specifying information from the terminal device;
    acquiring, using a reward-related information acquisition unit, reward-related information related to reward information regarding two or more cards that a user can use at the store, wherein the reward-related information acquisition unit uses two or more pieces of reward information included in card information regarding two or more cards corresponding to two or more pieces of card information included in store information regarding a store specified by the store specifying information received by the store specifying information accepting unit, out of two or more cards specified by the owned-card specifying information that is stored information that specifies two or more cards owned by the user who purchases an item or a service,
        wherein the reward-related information acquisition unit converts the reward-related information into information pertaining to benefits awarded by each of the two or more cards and provides a recommendation on which of the two or more cards to be used at the store; and
    outputting, using a reward-related information output unit, the reward-related information acquired by the reward-related information acquisition unit to the terminal device,
the terminal device is configured to perform
    accepting, using a second store specifying information accepting unit, the store specifying information;
    transmitting, using a store specifying information transmitting unit, the store specifying information accepted by the second store specifying information accepting unit to the server device;
    acquiring, using a second owned-card specifying information acquisition unit, owned-card specifying information from an owned-card specifying information storage unit that stores the owned-card specifying information;
    transmitting, using an owned-card specifying information transmitting unit, the owned-card specifying information acquired by the second owned-card specifying information acquisition unit to the server device;
    receiving, using a reward-related information receiving unit, the reward-related information from the server device; and
    transmitting, using a reward-related information transmitting unit, the reward-related information received by the reward-related information receiving unit to the card device; and
the card device is configured to perform:
    receiving, using a second reward-related information receiving unit, the reward-related information from the terminal device; and
    outputting, using a second reward-related information output unit, the reward-related information received by the second reward-related information receiving unit, wherein the card device is separate from the terminal device, and
the card device is configured to detect a shake imparted thereto by the user and, upon detecting the shake, the card device is configured to transmit, to the terminal device, an instruction to transmit store specifying information to the server device.

2. The information system according to claim 1, wherein the reward-related information acquisition unit uses reward information regarding two or more cards that the user can use at the store, to acquire reward-related information that specifies a card corresponding to reward information that indicates the highest reward, based on a predetermined method.

3. The information system according to claim 1, wherein the reward-related information acquisition unit uses reward information regarding two or more cards that the user can use at the store, to acquire ranks of the two or more pieces of reward information, based on a predetermined method, and acquire reward-related information that specifies the ranks.

4. The information system according to claim 1, wherein the server device is further configured to perform:
    storing, using a credit card information storage unit, credit card information that includes at least a credit card number of a card;
    receiving, using a card selection accepting unit, selection of one card from among two or more cards in response to reward-related information being output by the reward-related information output unit;
    outputting, using a credit card information output unit, at least a credit card number included in credit card information that is stored in the credit card information storage unit and that constitutes a pair with the one card; and
    changing, using a credit card number changing unit and when a predetermined condition is satisfied, a credit card number included in each of one or more pieces of credit card information stored in the credit card information storage unit.

5. A server device comprising:
a store information storage unit in which two or more pieces of store information are stored, each piece of store information including
(1) a store identifier that identifies a store, and
(2) two or more pieces of card information, each including
    (i) a card identifier that identifies a card that is available at the store, and (ii) reward information regarding a reward that is gained when the card is used at the store wherein the server device is configured to perform receiving, using a store specifying information receiving unit, store specifying information that specifies a store in which a card is used to purchase an item or a service offered by the store;

receiving, using an owned-card specifying information acquisition unit, owned-card specifying information that specifies two or more cards owned by a user;

acquiring, using a reward-related information acquisition unit, reward-related information related to reward information regarding two or more cards that the user can use at the store, wherein the reward-related information acquisition unit uses two or more pieces of reward information included in card information regarding two or more cards corresponding to two or more pieces of card information included in store information regarding a store specified by the store specifying information received by the store specifying information receiving unit, out of two or more cards specified by the owned-card specifying information that is stored information that specifies two or more cards owned by the user who purchases an item or a service, wherein the reward-related information acquisition unit converts the reward-related information into information pertaining to benefits awarded by each of the two or more cards and provides a recommendation on which of the two or more cards to be used at the store;

outputting, using a reward-related information output unit, the reward-related information acquired by the reward-related information acquisition unit, wherein the server device is configured to receive store specifying information based on an instruction transmitted from the card, the card transmitting the instruction upon detecting a shake imparted thereto by the user of the card.

* * * * *